US008179540B2

(12) United States Patent
Hiruma et al.

(10) Patent No.: US 8,179,540 B2
(45) Date of Patent: May 15, 2012

(54) IMAGE FORMING APPARATUS AND MANAGEMENT SYSTEM UTILIZING COUNTER AND JOB LOG INFORMATION FOR USAGE TRACKING

(75) Inventors: Junichi Hiruma, Hidaka (JP);
Nobuyuki Tonegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 715 days.

(21) Appl. No.: 12/260,240

(22) Filed: Oct. 29, 2008

(65) Prior Publication Data

US 2009/0109462 A1   Apr. 30, 2009

(30) Foreign Application Priority Data

Oct. 31, 2007 (JP) ................. 2007-283545

(51) Int. Cl.
*G06K 15/22* (2006.01)
*G03G 15/08* (2006.01)

(52) U.S. Cl. ............... 358/1.13; 358/1.15; 358/1.14; 358/1.16; 358/1.17; 358/1.18; 358/1.9; 358/1.1; 358/1.2; 358/474; 358/426.01; 358/426.06; 358/426.12; 358/448; 358/496; 358/502; 358/515; 358/518; 358/296; 712/23; 712/200; 712/202; 712/206; 712/210; 712/215; 712/216; 712/217; 712/218; 712/240; 709/201; 709/203; 709/217; 709/218; 709/226; 709/229; 705/7.13; 705/7.26; 705/7.34; 705/14.39; 705/14.24; 705/14.25; 705/26.1; 705/26.2; 705/26.81; 705/28; 705/34; 705/52; 705/64; 705/400; 705/412; 399/8; 399/10; 399/11; 399/24; 399/25; 399/27; 399/29; 399/35; 399/46; 399/79; 399/177; 399/236; 399/257; 399/350; 399/367

(58) Field of Classification Search .................. None
See application file for complete search history.

(56) References Cited

U.S. PATENT DOCUMENTS

| 5,745,662 A * | 4/1998 | Nagata et al. ............. 358/1.14 |
| 2004/0252337 A1 * | 12/2004 | Takabayashi et al. ....... 358/1.15 |
| 2007/0035638 A1 | 2/2007 | Naitoh |
| 2008/0174802 A1 * | 7/2008 | Sampath et al. ............ 358/1.13 |

FOREIGN PATENT DOCUMENTS

| JP | 2006-190219 | 7/2006 |
| JP | 2006-264907 A | 10/2006 |
| JP | 2007-018500 | 1/2007 |
| JP | 2007-083682 A | 4/2007 |

* cited by examiner

*Primary Examiner* — Steven Kau

(74) *Attorney, Agent, or Firm* — Canon USA Inc. IP Division

(57) ABSTRACT

An image forming apparatus is provided that holds counter information obtained by integrating a consumption of a consumable that depends on usage of service provided by the image forming apparatus. A log corresponding to the usage of the service is set in job log information with a synchronization flag set off. The log in the job log information, for which the synchronization flag is set off, is set on. The counter information and the job log information are output after the synchronization flag for the log having the synchronization flag set off has been set on.

7 Claims, 21 Drawing Sheets

FIG. 6

| | SYNCHRONIZATION FLAG | RECEIPT No. | DATE | TIME | ... | TYPE | RESULT |
|---|---|---|---|---|---|---|---|
| 502 — WRITE → | | 5194 | 6/30 | 2:00 | ... | OVERSEA SENDING | OK |
| 503 — → | | 5195 | 6/30 | 4:00 | ... | OVERSEA SENDING | OK |
| 504 — WRITE Ptr | | 5196 | 7/1 | 7:00 | ... | ORDINARY SENDING | OK |
| 505 — | ✓ | 5117 | 4/30 | 7:00 | ... | OVERSEA SENDING | OK |
| 506 — | ✓ | 5118 | 5/1 | 1:00 | ... | ORDINARY SENDING | OK |
| 507 — | ✓ | 5119 | 5/2 | 2:00 | ... | ORDINARY SENDING | OK |
| 508 — | ... | ... | ... | ... | ... | ... | ... |
| 509 — | ✓ | 5177 | 5/30 | 4:00 | ... | ORDINARY SENDING | OK |
| 510 — FINAL CONFIRMATION POSITION | ✓ | 5178 | 5/30 | 4:00 | ... | OVERSEA SENDING | OK |
| 511 — STRAT | | 5179 | 5/30 | 5:00 | ... | ORDINARY SENDING | OK |
| 512 — WRITE | | 5180 | 5/31 | 6:00 | ... | TOLL-FREE SENDING | OK |
| 513 — → | | 5181 | 6/1 | 7:00 | ... | ORDINARY SENDING | OK |
| 514 — | | 5182 | 6/2 | 1:00 | ... | OVERSEA SENDING | OK |
| 515 — | | 5183 | 6/3 | 2:00 | ... | ORDINARY SENDING | NG |
| 516 — | | ... | ... | ... | ... | ... | ... |
| 517 — WRITE | | 5193 | 6/29 | 7:00 | ... | ORDINARY SENDING | OK |

JOB LOG FILE OF JUNE (MFP-a)   551

| | | | | | |
|---|---|---|---|---|---|
| 505 — ✓ | 5117 | 4/30 | 7:00 | ----- OVERSEA SENDING | --- OK |
| 506 — ✓ | 5118 | 5/1 | 1:00 | ----- OVERSEA SENDING | --- OK |
| 507 — ✓ | 5119 | 5/2 | 2:00 | ----- ORDINARY SENDING | --- OK |
| 508 — ✓ | | | | · · · · · · · · · · · · · · | |
| 509 — ✓ | 5177 | 5/30 | 4:00 | ----- ORDINARY SENDING | --- OK |
| 510 — ✓ | 5178 | 5/30 | 4:00 | ----- OVERSEA SENDING | --- OK |
| 511 — | 5179 | 5/30 | 5:00 | ----- ORDINARY SENDING | --- OK |
| 512 — | 5180 | 5/31 | 6:00 | ----- TOLL-FREE SENDING | --- OK |
| 513 — | 5181 | 6/1 | 7:00 | ----- ORDINARY SENDING | --- OK |
| 514 — | 5182 | 6/2 | 1:00 | ----- OVERSEA SENDING | --- OK |
| 515 — | 5183 | 6/3 | 2:00 | ----- ORDINARY SENDING | --- NG |
| 516 — | | | | · · · · · · · · · · · · · · · · · · | |
| 517 — | 5193 | 6/29 | 7:00 | ----- ORDINARY SENDING | --- OK |
| 502 — | 5194 | 6/30 | 2:00 | ----- OVERSEA SENDING | --- OK |
| 503 — | 5195 | 6/30 | 4:00 | ----- OVERSEA SENDING | --- OK |
| 504 — | 5196 | 7/1 | 7:00 | ----- ORDINARY SENDING | --- OK |

JOB LOG INFORMATION OF MAY (MFP-b) — 801

| ✓ | 5100 | 4/28 | 7:00 | --- | OVERSEA SENDING | -- | OK |
| ✓ | 5117 | 4/30 | 7:00 | --- | OVERSEA SENDING | -- | OK |
| ✓ | 5118 | 5/1 | 1:00 | --- | ORDINARY SENDING | -- | OK |
| ✓ | 5119 | 5/2 | 2:00 | --- | ORDINARY SENDING | -- | OK |
| ✓ | ... | ... | ... | ... | ... | ... | ... |
| ✓ | 5177 | 5/30 | 4:00 | --- | ORDINARY SENDING | -- | OK |
| ✓ | 5178 | 5/30 | 4:00 | --- | OVERSEA SENDING | -- | OK |
|   | 5179 | 5/30 | 5:00 | --- | ORDINARY SENDING | -- | OK |
|   | 5180 | 5/31 | 6:00 | --- | TOLL-FREE SENDING | -- | OK |
|   | 5181 | 6/1 | 7:00 | --- | ORDINARY SENDING | -- | OK |
|   | 5182 | 6/2 | 1:00 | --- | OVERSEA SENDING | -- | OK |
|   | 5183 | 6/3 | 2:00 | --- | ORDINARY SENDING | -- | NG |

Labels: 850, 851, 852, 853, 854, 855, 856, 857, 858, 859, 860, 861, 862; 108

FIG. 11B

JOB LOG INFORMATION OF JUNE (MFP-b) — 802

| ✓ | 5178 | 5/30 | 4:00 | --- | OVERSEA SENDING | -- | OK |
| ✓ | 5179 | 5/30 | 5:00 | --- | ORDINARY SENDING | -- | OK |
| ✓ | 5180 | 5/31 | 6:00 | --- | TOLL-FREE SENDING | -- | OK |
| ✓ | 5181 | 6/1 | 7:00 | --- | ORDINARY SENDING | -- | OK |
| ✓ | 5182 | 6/2 | 1:00 | --- | OVERSEA SENDING | -- | OK |
| ✓ | 5183 | 6/3 | 2:00 | --- | ORDINARY SENDING | -- | NG |
| ✓ | ... | ... | ... | ... | ... | ... | ... |
| ✓ | 5193 | 6/29 | 7:00 | --- | ORDINARY SENDING | -- | OK |
| ✓ | 5194 | 6/30 | 2:00 | --- | OVERSEA SENDING | -- | OK |
| ✓ | 5195 | 6/30 | 4:00 | --- | OVERSEA SENDING | -- | OK |
| ✓ | 5196 | 7/1 | 7:00 | --- | ORDINARY SENDING | -- | OK |
|   | 5197 | 7/2 | 1:00 | --- | OVERSEA SENDING | -- | OK |
|   | 5198 | 7/3 | 5:00 | --- | ORDINARY SENDING | -- | NG |

Labels: 857, 858, 859, 860, 861, 862, 863, 864, 865, 866, 867, 868, 869; 108

FIG. 11C

JOB LOG REAL FILE OF JUNE (MFP-b) — 803

| ✓ | 5179 | 5/30 | 5:00 | --- | ORDINARY SENDING | -- | OK |
| ✓ | 5180 | 5/31 | 6:00 | --- | TOLL-FREE SENDING | -- | OK |
| ✓ | 5181 | 6/1 | 7:00 | --- | ORDINARY SENDING | -- | OK |
| ✓ | 5182 | 6/2 | 1:00 | --- | OVERSEA SENDING | -- | OK |
| ✓ | 5183 | 6/3 | 2:00 | --- | ORDINARY SENDING | -- | NG |
| ✓ | ... | ... | ... | ... | ... | ... | ... |
| ✓ | 5193 | 6/29 | 7:00 | --- | ORDINARY SENDING | -- | OK |
| ✓ | 5194 | 6/30 | 2:00 | --- | OVERSEA SENDING | -- | OK |
| ✓ | 5195 | 6/30 | 4:00 | --- | OVERSEA SENDING | -- | OK |
| ✓ | 5196 | 7/1 | 7:00 | --- | ORDINARY SENDING | -- | OK |

Labels: 858, 859, 860, 861, 862, 863, 864, 865, 866, 867; 108

FIG. 11D

DEDUCTION TARGET LIST FILE OF JUNE (MFP-b) — 804

| ✓ | 5183 | 6/3 | 2:00 | --- | ORDINARY SENDING | -- | NG |

Labels: 862; 108

FIG. 13

SALES SLIP EDITING SECTION (MFP-a)

| | THIS TIME | LAST TIME | NUMBER OF USES | DEDUCTION | UNIT PRICE | CHARGE |
|---|---|---|---|---|---|---|
| ■ FAX JOB | | | | | | |
| ORDINARY SENDING | 150 | 130 | 20 | | 50 | 1950 |
| TOLL-FREE SENDING | 100 | 98 | 2 | ☑ | 30 | 60 |
| OVERSEA SENDING (COUNTRY NUMBER 1) | 30 | 29 | 1 | ☐ | 100 | 100 |
| SUBTOTAL | | | | | | 2110 |
| ■ COPY JOB | | | | | | |
| COLOR (SMALL) | 600 | 500 | 100 | | 50 | 9900 |
| COLOR (LARGE) | 600 | 400 | 200 | ☑ | 80 | 30000 |
| MONOCHROME (SMALL) | 1000 | 800 | 200 | ☐ | 10 | 2000 |
| MONOCHROME (LARGE) | 900 | 700 | 200 | ☐ | 10 | 2000 |
| SUBTOTAL | | | | | | 43900 |
| | | | | | TOTAL | 47380 |

[PRINT]  [END OF EDIT]

FAX JOB LOG REAL FILE OF JUNE (MFP-a)
✓ 5179 5/30 5:00 — ORDINARY SENDING -- OK
✓ 5180 5/31 6:00 — TOLL-FREE SENDING -- OK
✓ 5181 6/1 7:00 — ORDINARY SENDING -- OK
✓ 5182 6/2 1:00 — OVERSEA SENDING -- OK
✓ 5183 6/3 2:00 — ORDINARY SENDING -- NG
  ⋮
✓ 5195 6/30 4:00 — OVERSEA SENDING -- OK
✓ 5196 7/1 7:00 — ORDINARY SENDING -- OK

COPY JOB LOG REAL FILE OF JUNE (MFP-a)
✓ 1179 5/30 6:00 — MONOCHROME (LARGE) -- OK
✓ 1180 5/31 7:00 — MONOCHROME (SMALL) -- OK
✓ 1181 6/1 8:00 — MONOCHROME (SMALL) -- OK
✓ 1182 6/2 2:00 — MONOCHROME (LARGE) -- OK
✓ 1183 6/3 3:00 — COLOR (SMALL) -- NG
  ⋮
✓ 1195 6/30 5:00 — COLOR (LARGE) -- OK
✓ 1196 7/1 8:00 — COLOR (LARGE) -- OK

FIG. 16

| | SYNCHRONIZATION FLAG | RECEIPT No. | DATE | TIME | ... | TYPE | RESULT |
|---|---|---|---|---|---|---|---|
| 1250 | 6 | 5194 | 6/30 | 2:00 | ... | OVERSEA SENDING | OK |
| 1251 | 6 | 5195 | 6/30 | 4:00 | ... | OVERSEA SENDING | OK |
| 1252 | 6 | 5196 | 7/1 | 7:00 | ... | ORDINARY SENDING | OK |
| 1253 | 4 | 5117 | 4/29 | 7:00 | ... | OVERSEA SENDING | OK |
| 1254 | 4 | 5118 | 4/30 | 1:00 | ... | ORDINARY SENDING | OK |
| 1255 | 5 | 5119 | 5/2 | 2:00 | ... | ORDINARY SENDING | OK |
| 1256 | 5 | ... | ... | ... | ... | ... | ... |
| 1257 | 5 | 5177 | 5/30 | 4:00 | ... | ORDINARY SENDING | OK |
| 1258 | 5 | 5178 | 5/30 | 4:00 | ... | OVERSEA SENDING | OK |
| 1259 | 6 | 5179 | 5/30 | 5:00 | ... | ORDINARY SENDING | OK |
| 1260 | 6 | 5180 | 5/31 | 6:00 | ... | TOLL-FREE SENDING | OK |
| 1261 | 6 | 5181 | 6/1 | 7:00 | ... | ORDINARY SENDING | OK |
| 1262 | 6 | 5182 | 6/2 | 1:00 | ... | OVERSEA SENDING | OK |
| 1263 | 6 | 5183 | 6/3 | 2:00 | ... | ORDINARY SENDING | NG |
| 1264 | 6 ... | ... | ... | ... | ... | ... | ... |
| 1265 | 6 | 5193 | 6/29 | 7:00 | ... | ORDINARY SENDING | OK |

COUNTER INFORMATION OF JUNE
(MFP-a) — 1300

- 1022 — ORDINARY SENDING — 150
- 1023 — TOLL-FREE SENDING — 100
- 1024 — OVERSEA SENDING (COUNTRY NUMBER 1) — 30

(1301)

- 1025 — COLOR COPY (SMALL) — 600
- 1026 — COLOR COPY (LARGE) — 600
- 1027 — MONOCHROME COPY (SMALL) — 1000
- 1028 — MONOCHROME COPY (LARGE) — 900

FAX JOB LOG REAL FILE OF JUNE
(MFP-a) — 1310

108

- ✓ 5179 5/30 5:00 --- ORDINARY SENDING --- OK
- ✓ 5180 5/31 6:00 --- TOLL-FREE SENDING --- OK
- ✓ 5181 6/1 7:00 --- ORDINARY SENDING --- OK
- ✓ 5182 6/2 1:00 --- OVERSEA SENDING --- OK
- ✓ 5183 6/3 2:00 --- ORDINARY SENDING --- NG
- ..............................
- ✓ 5195 6/30 4:00 --- OVERSEA SENDING --- OK

FIG. 17C

COPY JOB LOG REAL FILE OF JUNE
(MFP-a) — 1320

108

- ✓ 1179 5/30 6:00 --- MONOCHROME (LARGE) --- OK
- ✓ 1180 5/31 7:00 --- MONOCHROME (SMALL) --- OK
- ✓ 1181 6/1 8:00 --- MONOCHROME (SMALL) --- OK
- ✓ 1182 6/2 2:00 --- MONOCHROME (SMALL) --- OK
- ✓ 1183 6/3 3:00 --- COLOR (SMALL) --- NG
- ..............................
- ✓ 1195 6/30 5:00 --- COLOR (LARGE) --- OK

FIG. 19

SALES SLIP EDITING SCREEN                                                    1221

|  |  | 1016 THIS TIME | 1017 LAST TIME | 1018 NUMBER OF USES | 1019 DEDUCTION | 1020 UNIT PRICE | 1021 CHARGE |
|---|---|---|---|---|---|---|---|
| | ■FAX JOB | 1004 | 1006 | 1008 | 1010 | 1012 | 1014 |
| 1022 | ORDINARY SENDING | 150 | 130 | 20 | 1 | 50 | 1950 |
| 1023 | TOLL-FREE SENDING | 100 | 98 | 2 | 0 | 30 | 60 |
| 1024 | OVERSEA SENDING (COUNTRY NUMBER 1) | 30 | 29 | 1 | 0 | 100 | 100 |
| 1029 | SUBTOTAL | | | | | | 2110 |
| | ■COPY JOB | 1005 | 1007 | 1009 | 1011 | 1013 | 1015 |
| 1025 | COLOR (SMALL) | 600 | 500 | 100 | 1 | 50 | 9000 |
| 1026 | COLOR (LARGE) | 600 | 400 | 200 | 0 | 80 | 30000 |
| 1027 | MONOCHROME (SMALL) | 1000 | 800 | 200 | 0 | 10 | 2000 |
| 1028 | MONOCHROME (LARGE) | 900 | 700 | 200 | 0 | 10 | 2000 |
| 1030 | SUBTOTAL | | | | | | 43900 |
| | | | | | 1031 | TOTAL | 47380 |

1032 [PRINT]   1223 [END]

FIG. 20A

SALES SLIP REPORT OF JUNE (MFP-c) — 1330

| | THIS TIME (1016) | LAST TIME (1017) | NUMBER OF USES (1018) | DEDUCTION (1019) | UNIT PRICE (1020) | CHARGE (1021) |
|---|---|---|---|---|---|---|
| ■FAX JOB | 1004 | 1006 | 1008 | 1010 | 1012 | 1014 |
| 1022 ORDINARY SENDING | 150 | 130 | 20 | 1 | 50 | 1950 |
| 1023 TOLL-FREE SENDING | 100 | 98 | 2 | 0 | 30 | 60 |
| 1024 OVERSEA SENDING (COUNTRY NUMBER 1) | 30 | 29 | 1 | 0 | 100 | 100 |
| 1029 SUBTOTAL | | | | | | 2110 |
| ■COPY JOB | 1005 | 1007 | 1009 | 1011 | 1013 | 1015 |
| 1025 COLOR (SMALL) | 600 | 500 | 100 | 1 | 50 | 9000 |
| 1026 COLOR (LARGE) | 600 | 400 | 200 | 0 | 80 | 30000 |
| 1027 MONOCHROME (SMALL) | 1000 | 800 | 200 | 0 | 10 | 2000 |
| 1028 MONOCHROME (LARGE) | 900 | 700 | 200 | 0 | 10 | 2000 |
| 1030 SUBTOTAL | | | | | | 43900 |
| 1031 TOTAL | | | | | | 47380 |

FIG. 20B

JOB LOG INFORMATION REPORT — 1340

| | 1341 | | | | | |
|---|---|---|---|---|---|---|
| 1253 | 4 * | 5117 | 4/30 | 7:00 | OVERSEA SENDING | OK |
| 1254 | 4 * | 5118 | 5/1 | 1:00 | OVERSEA SENDING | OK |
| 1255 | 5 * | 5119 | 5/2 | 2:00 | ORDINARY SENDING | OK |
| 1256 | 5 * | | | | | |
| 1257 | 5 * | 5177 | 5/30 | 4:00 | ORDINARY SENDING | OK |
| 1258 | 5 * | 5178 | 5/30 | 4:00 | OVERSEA SENDING | OK |
| 1259 | 6 * | 5179 | 5/30 | 5:00 | ORDINARY SENDING | OK |
| 1260 | 6 * | 5180 | 5/31 | 6:00 | TOLL-FREE SENDING | OK |
| 1261 | 6 * | 5181 | 6/1 | 7:00 | ORDINARY SENDING | OK |
| 1262 | 6 * | 5182 | 6/2 | 1:00 | OVERSEA SENDING | OK |
| 1263 | 6 * | 5183 | 6/3 | 2:00 | ORDINARY SENDING | NG |
| 1264 | 6 * | ........ | | | | |
| 1265 | 6 * | 5193 | 6/29 | 7:00 | ORDINARY SENDING | OK |
| 1250 | 6 * | 5194 | 6/30 | 2:00 | OVERSEA SENDING | OK |
| 1251 | 6 * | 5195 | 6/30 | 4:00 | OVERSEA SENDING | OK |
| 1252 | 6 * | 5196 | 7/1 | 7:00 | ORDINARY SENDING | OK |

IMAGE FORMING APPARATUS AND MANAGEMENT SYSTEM UTILIZING COUNTER AND JOB LOG INFORMATION FOR USAGE TRACKING

BACKGROUND OF THE INVENTION

1. Field of the Invention

The present invention relates to a technique for executing a billing process with respect to image formation by utilizing counter information and job log information which are obtained from an image forming apparatus.

2. Description of the Related Art

Recently, services allowing customers to take a copy and send a FAX have been widely provided by installing image forming apparatuses (such as Multi-Function Peripherals (MFP) and copying machines) in convenience stores, copy shops, etc.

Sales of those copying and other services are managed by, e.g., servicemen who directly go to the shops, output counter information stored in the image forming apparatus on paper, and manually issue sales slips on the basis of the counter information. Also, the counter information stored in the image forming apparatus is collected into, e.g., a collection server through a network.

The sales of services provided in convenience stores, which are checked on the basis of the collected counter information, are distributed to the shops, companies having installed the image forming apparatuses, etc.

Also, there is known a technique for obtaining counter information from an image forming apparatus per department and utilizing the counter information for billing. In such a case, whether the counter information is correctly obtained is confirmed by using total counter information of the image forming apparatus and the sum of individual data of the counter information per department. In Japanese Patent Laid-Open No. 2007-18500, for example, a total billing count is obtained from the image forming apparatus, and a billing count per department is then obtained. If the total billing count does not match with the sum of the billing counts obtained per department, the billing counts are obtained again after waiting for a while. The reason is that, when the counter information per department is obtained after obtaining the total counter information, a mismatch therebetween may occur, for example, if a user makes, e.g., printing during a process of obtaining the counter information.

For the service that provides the billing information to customers, if there is a mismatch between a total number of printing by the image forming apparatus and a total value of numbers of printing counted per department, there is a reduction of reliability of the billing information. For that reason, Japanese Patent Laid-Open No. 2007-18500 performs the above-described processing.

In Japanese Patent Laid-Open No. 2006-190219, a history of services (such as monochrome printing, color printing, copying, and FAX sending) provided by an image forming apparatus is obtained through a network. On the basis of the service history, the number of outputs is then totalized per service type for a certain period to calculate a counter charge from the number of outputs per service type and to output a detailed list of charges.

With an increase in the types of services provided by an image forming apparatus installed in a convenience store, etc., work of confirming sales on paper obtained by outputting the counter information becomes more intricate and an error is more apt to occur in a totaling process.

Further, if a paper jam occurs during copying, a copy counter in the apparatus may increase the copy count in spite of the fact that copying has not been correctly performed. Properly speaking, because the copying charge is calculated on the basis of a numerical value of the counter information, the charge corresponding to the number of copies missed due to the paper jam, etc. generally should be returned as an amount of deduction.

Job log information can be provided that records a success or a failure per copy job instructed to run, which can be obtained separately from the image forming apparatus in addition to the counter information.

Hitherto, the counter information and the job log information have been collected by different devices in many cases. This may cause an error due to a difference in timing of collecting the information and a difference in time required to collect the information. The error due to a difference in timing of collecting the information can cause the counter information and the job log information to not match with each other in a total value and a correct amount of deduction may not be obtained.

SUMMARY OF THE INVENTION

An exemplary embodiment of the present invention provides a scheme with which a usage situation of services provided by an image forming apparatus can be confirmed by collecting the counter information and the job log information in a corresponding relation.

Also, an exemplary embodiment of the present invention provides a scheme by which, even when a plurality of image forming apparatuses are managed or even when the counter information and the job log information are managed by different devices, a usage situation of services can be more flexibly confirmed.

According to one exemplary embodiment of the present invention, an image forming apparatus is provided that is connected to a management server, which manages plural image forming apparatuses. The image forming apparatus holds counter information obtained by integrating a consumption of a consumable that depends on usage of service provided by the image forming apparatus. The image forming apparatus includes a registration unit configured to register a log, including information regarding a history of usage of the service, in job log information with a synchronization flag set off, the synchronization flag being used for synchronization with outputting of the counter information. The image forming apparatus also includes a flag setting unit configured to set on the synchronization flag for the log in the job log information, for which the synchronization flag is set off, when the counter information is output The image forming apparatus further includes a counter outputting unit configured to output the counter information to the management server after the synchronization flag for the log having the synchronization flag set off has been set on by the flag setting unit, and also includes a log outputting unit configured to output the job log information to the management server after the counter information has been output by the counter outputting unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodi

FIG. 6 is a table illustrating an embodiment of job log information that is managed by using a ring buffer in the image forming apparatus.

FIG. 7 illustrates an embodiment of a job log information file prepared based on the job log information that is managed by using the ring buffer.

FIG. 11A illustrates an embodiment of a job log information file of May, FIG. 11B illustrates an embodiment of a job log information file of June, FIG. 11C illustrates an embodiment of a job log real file of June, and FIG. 11D illustrates an embodiment of a deduction target list file of June.

FIG. 13 illustrates an embodiment of a sales slip editing screen for producing a sales slip by a slip producing server.

FIG. 16 is a table illustrating an embodiment of job log information that is managed by using the ring buffer in an image forming apparatus.

FIG. 17A illustrates an embodiment of a counter information file obtained when the counter information of June is output as a slip in an image forming apparatus, FIG. 17B illustrates an embodiment of a FAX jog log real file of June obtained when it is output as a slip in an image forming apparatus, and FIG. 17C illustrates an embodiment of a copy job log real file of June obtained when it is output as a slip in an image forming apparatus.

FIG. 19 illustrates another embodiment of a sales slip producing screen for producing a slip in an image forming apparatus.

FIG. 20A illustrates an embodiment of a sales slip report prepared in an image forming apparatus, and FIG. 20B illustrates an embodiment of a job log real file of June obtained when it is output as a slip report in an image forming apparatus.

DESCRIPTION OF THE EMBODIMENTS

Embodiments of the invention will be described below with reference to the drawings.

Figure 1:
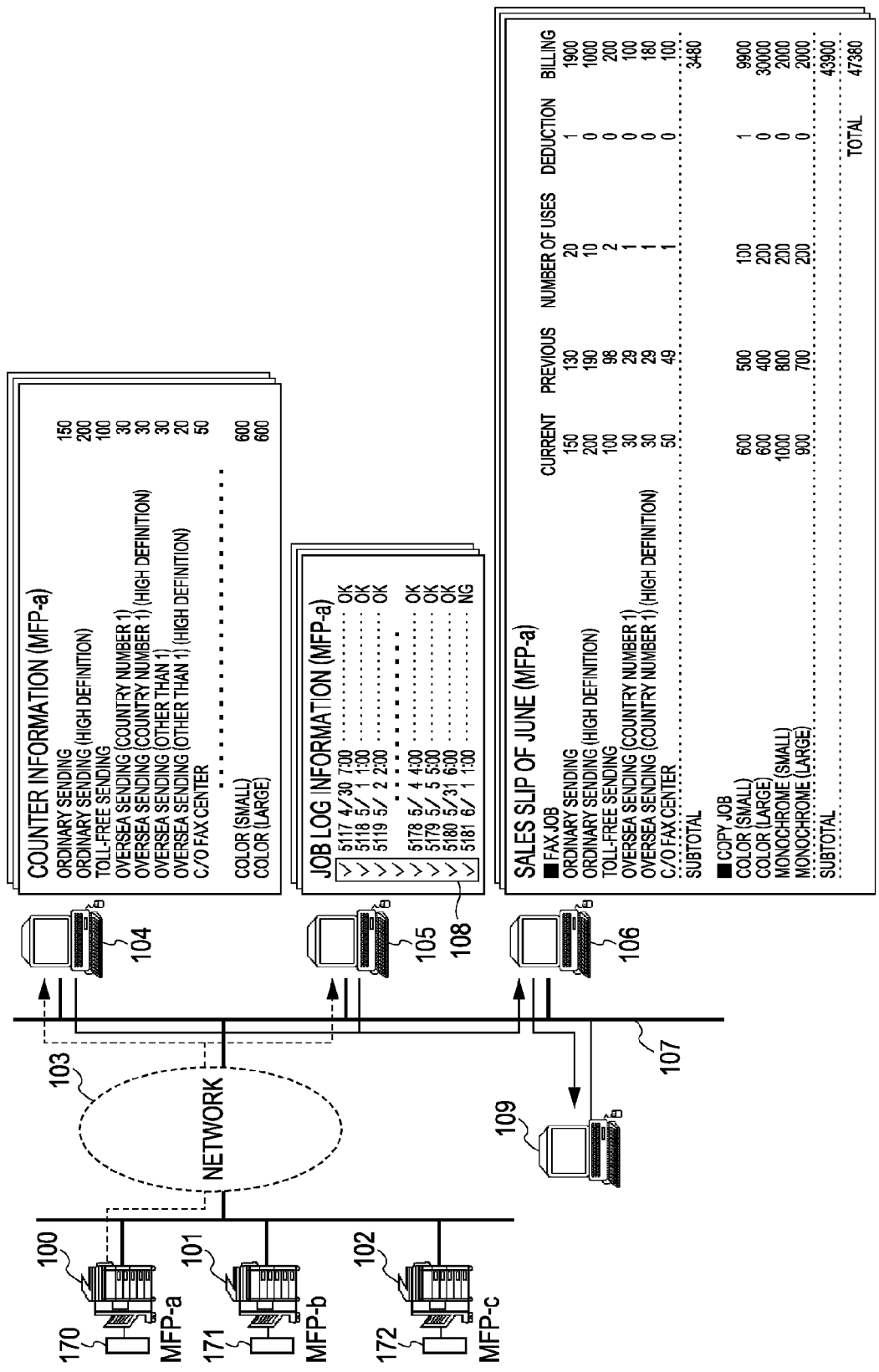
- FIG. 1 is a block diagram illustrating an embodiment of a network connection configuration.

FIG. 1 is a block diagram illustrating an embodiment of a network connection configuration in an exemplary management system.

Numerals 100 (MFP-a), 101 (MFP-b) and 102 (MFP-c) denote image forming apparatuses installed in highly public places, such as copy shops, convenience stores, hotels, and stations. Each of the image forming apparatuses has at least one of a scanner function, printer function, etc., and can provide at least one of copy service, FAX sending service, FAX receiving service, net print service, etc. For example, the net print service provides a function for printing application data that is used in, e.g., a word processor and is posted to a Web server.

Payment vendors 170 to 172 are connected respectively to the image forming apparatuses 100 to 102. Charges to be paid for the copy service, the FAX sending/receiving service, the net print service, etc. are collected through the payment vendors. Counter information and job log information are output to an external device described later.

The image forming apparatuses 100, 101 and 102 are constructed to be able to transmit and receive information to and from a counter collection server 104 and a job log collection server 105 via a network 103.

A slip producing server 106 is constructed to be able to transmit and receive information to and from the counter collection server 104 and the job log collection server 105 via a network 107.

The counter collection server 104 is capable of periodically collecting counter information at intervals of a certain period, e.g., monthly, from each of the image forming apparatuses 100 to 102. When acquiring the counter information output from the image forming apparatus as described later, the ID information specific to the image forming apparatus, the model name and the installation site thereof may also be similarly acquired and managed in addition to the counter information.

The job log collection server 105 is capable of periodically, e.g., monthly, collecting job log information for the provided services, such as FAX job log information and copy job log information, from each of the image forming apparatuses 100 to 102. The term "job log information" means information obtained by registering and accumulating a log (history) including for example attribute information, such as the date (month/day/time) when the FAX, copy and other services were utilized, the service type, the processing result, the receipt number, a synchronization flag (described later), and the number of sheets ejected. The job log information is held for each of the image forming apparatuses. When acquiring the job log information output from the image forming apparatus as described later, the ID information specific to the image forming apparatus, the model name and the installation site thereof may also be similarly acquired and managed in addition to the jog log information.

The slip producing server 106 is capable of collecting the counter information from the counter collection server 104 and the job log information from the job log collection server 105. Further, the slip producing server 106 is capable of totaling sales on the basis of the acquired information and producing a sales slip.

A billing server 109 collects the sales slip from the slip producing server 106 to, for example, bill users and distribute the sales slip to a service provider.

Figure 2:
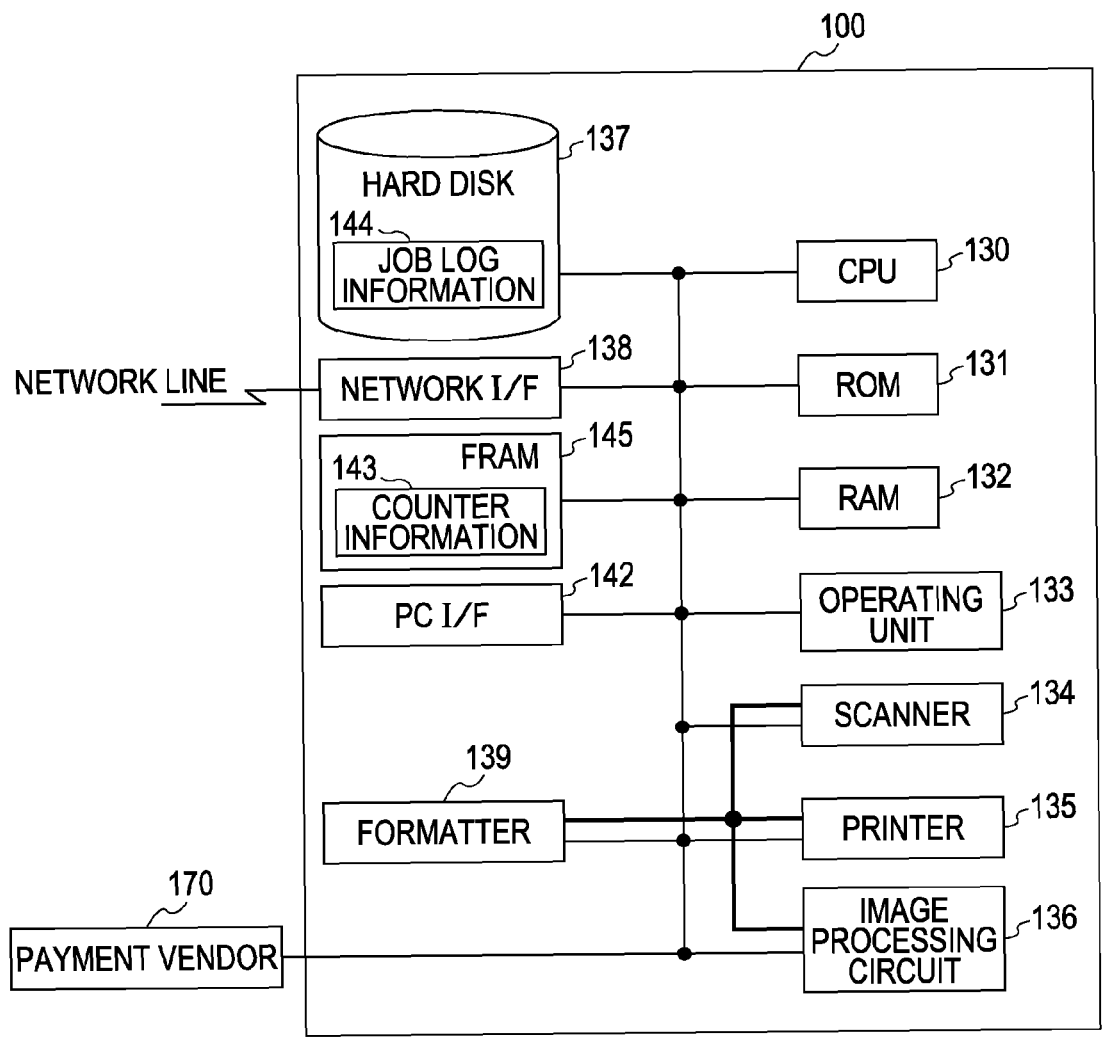
FIG. 2 is a block diagram of one embodiment of a system configuration of an image forming apparatus.

FIG. 2 illustrates an embodiment of a hardware configuration of the image forming apparatus.

A CPU 130 is a control circuit for controlling an entire system by employing various control programs, which are stored in a ROM 131, and a memory area of a RAM 132.

An operating unit 133 is made up of, for example, an LCD display panel, a start key, and hard keys including a numeric keypad. In one version, the operating unit 133 displays details of the services and buttons on the LCD panel to accept a user operation by detecting a touch of a user's finger upon the button.

A scanner 134 converts image data of a document to electronic data through photoelectric conversion. More specifically, in one version, in the scanner 134, when a document is conveyed from a document feeder to a platen glass and it is placed on the platen glass, a lamp is illuminated and a scanner unit is started to move for exposing and scanning the document. The reflected light from the document is introduced to a CCD image sensor through a mirror and a lens and is converted to an electric signal. The electric signal is further converted to digital data by an A/D conversion circuit. After reading of the document, the document on the platen glass is ejected.

A printer 135 prints the electronic data (image data) on a recording sheet. More specifically, in one version, a laser beam corresponding to the electronic data is emitted from a laser emission unit and is irradiated to a photosensitive drum, whereby a latent image corresponding to the laser beam is formed on the photosensitive drum. A developer (toner) is attached to the latent image on the photosensitive drum. The recording sheet is fed from a paper supply cassette and is conveyed to a transfer section at timing in sync with the start of irradiation of the laser beam so that the developer attached to the photosensitive drum is transferred to the recording sheet. The recording sheet including the transferred developer is conveyed to a fusing section where the developer is fixedly fused to the recording sheet by the action of heat and pressure applied in the fusing section. The recording sheet having passed the fusing section is ejected by an ejection roller and is sorted by a sorter such that the ejected sheet is put into corresponding one of bins.

An image processing circuit 136 can comprise at least one of a large-capacity image memory, an image rotation circuit, a resolution varying circuit, a encoding/decoding circuit for, e.g., MH, MR, MMR, JBIG and JPEG, etc. The image processing circuit 136 can execute various types of image processing, such as for example at least one of shading, trimming, and masking.

A hard disk 137 is a large-capacity recording medium connected through an I/F based on, e.g., SCSI (Small Computer Scale Interface or IDE (Integrated Device Electronics).

A network I/F 138 is a circuit for connection to a network line, such as for example ETHERNET (registered trade name) or a token ring represented by 10 BASE-T or 100 BASE-T.

A formatter 139 is a module for rendering, such as for example producing image data from PDL (Page Description Language) data. For example, the formatter 139 may perform rendering of PDL data that is received through a parallel interface according to IEEE1284, a serial interface PC I/F 142 such as a USB interface, or a network I/F circuit. The image data produced by the rendering may be subjected to image processing in the image processing circuit 136 and is printed by the printer 135.

The scanner 134, the printer 135, the image processing circuit 136, and the formatter 139 are connected to one another through a high-speed video bus that differs from a CPU bus extending from the CPU 130, thus enabling the image data to be transferred at a high speed among them. The copying function is realized by performing image processing on the image data, which has been read by the scanner 134, in the image processing circuit 136 and then printing the read image by the printer 135.

An additional FAX line may be prepared to provide the FAX function.

A payment vendor 170 is connected to the image forming apparatus 100 through a serial interface based on, e.g., USB (Universal Serial Bus), and it may have payment/refund accepting functions, receipt issuing functions, etc.

Counter information 143 is information of integrated data that is obtained by, for example, counting up a value one by one each time a sheet is used in the services such as FAX sending and copying. The counter information 143 is stored in a storage area of an FRAM 145. The counter information 143 may be obtained by counting, instead of a sheet, a parameter in another suitable unit so long as it can indicate the usage of the services as a numerical value. In this exemplary embodiment, the count number indicating a usage situation of the FAX sending service is called FAX counter information, and the count number indicating a usage situation of the copy service is called copy counter information.

Job log information 144 is information representing a history of usage of at least one of the FAX sending, copy, and other services, and is stored in a storage area of the hard disk 137 or the RAM 132. The FAX job log information represents a history of usage of the FAX sending service, and the copy job log information represents a history of usage of the copy service.

Figure 3:
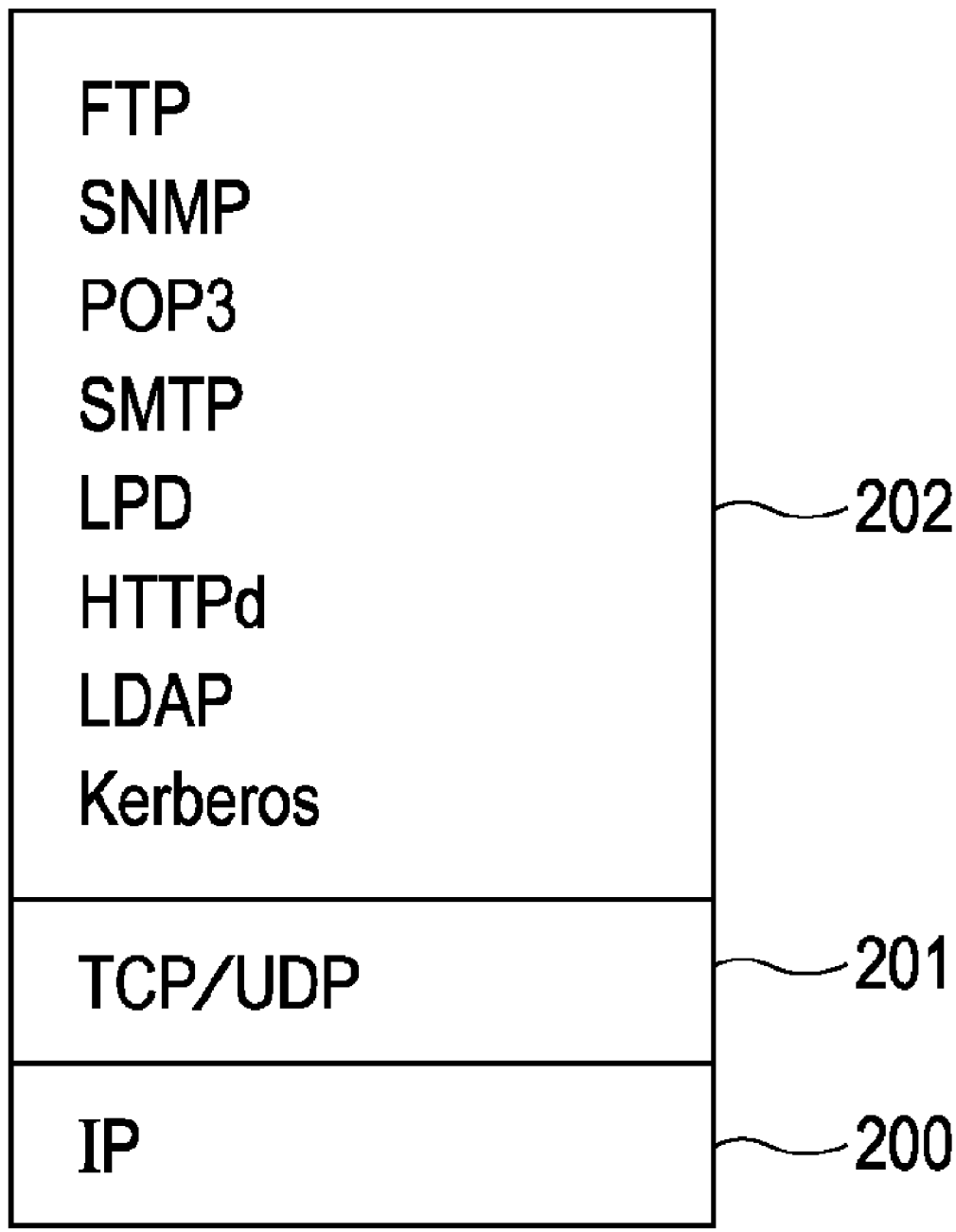
FIG. 3 illustrates an embodiment of a program configuration of the image forming apparatus.

FIG. 3 illustrates an embodiment of a protocol employed in the image forming apparatuses 100.

Programs may be mainly grouped into three layers, i.e., an IP (Internet Protocol) 200, a TCP (Transmission Control Protocol)/UDP (User Datagram Protocol) 201, and an application layer 202.

The IP 200 is an Internet protocol layer that provides the service of delivering a message from a source host to a destination host in cooperation with a relay node, such as a router. The IP 200 executes the routing function of managing the address of a source from which data is sent and the address of a destination which receives the data, and managing through what route data is delivered to the destination host within the network in accordance with the address information. The TCP/UDP 201 is a transport layer that provides the service of delivering a message from a sending application process to a receiving application process. The TCP is connection type service and assures high reliability of communication, while the UDP is connectionless type service and does not assure reliability of communication. The application layer 202 includes a plurality of protocols. There are FTP (File Transfer Protocol) for the file transfer service, SNMP (Simple Network Management Protocol) as a network management protocol, LPD (Line Printer Daemon) as a printing server protocol for the printer, and HTTPd as a protocol for a WWW (World Wide Web) server. Also, there are an electronic mail sending/receiving protocol SMTP (Simple Mail Transfer Protocol), and a mail download protocol POP3 (Post Office Protocol-Version 3). In addition, there is LDAP (Lightweight Directory Access Protocol) for managing the user's electronic mail address, etc. and accessing a directory database. Further, a Kerberos authentication program defined according to RFC1510 is included.

Figure 4:
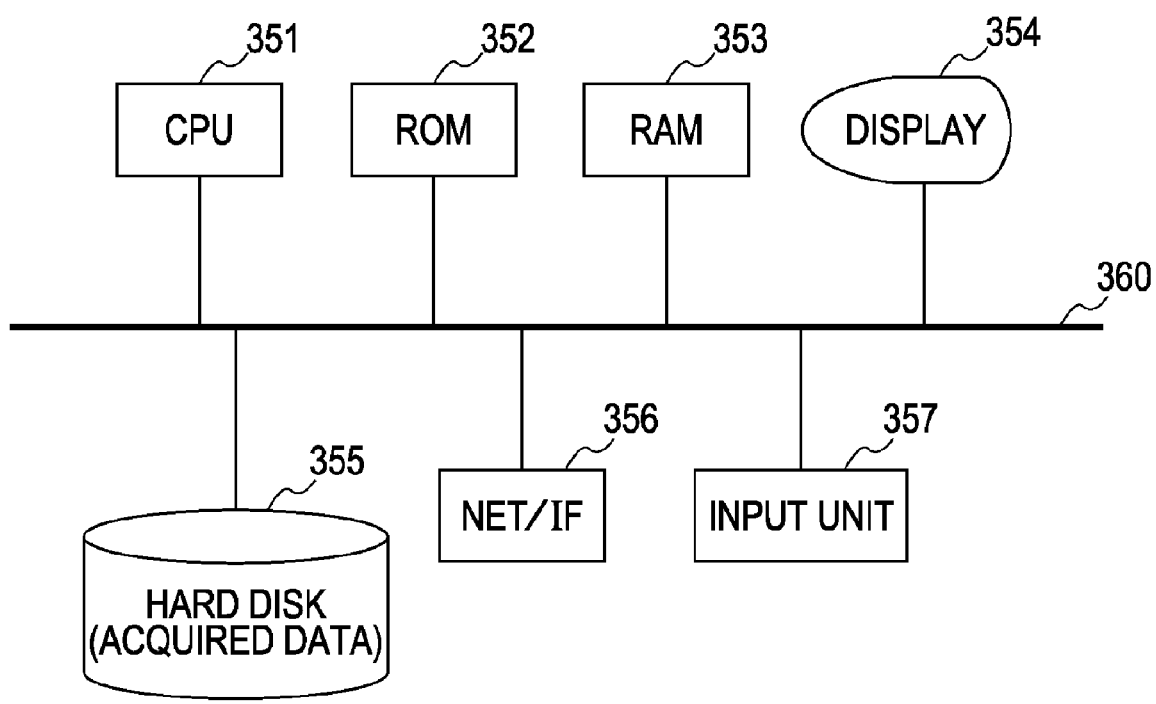
FIG. 4 is a block diagram of an embodiment of a system configuration of servers.

FIG. 4 is a block diagram of an embodiment of a hardware configuration of information processing apparatuses, such as the counter collection server 104, the job log collection server 105, and the slip producing server 106. Each hardware interconnects by a system bus 360.

A CPU 351 realizes various control processes by executing various control programs that are stored in the ROM 352 or the RAM 353. For example, a boot program activated at the time of booting up the relevant apparatus, and various parameters used in the relevant apparatus are stored in the ROM 352. A RAM 353 may serve as a main memory. A display 354 displays various matters under control of the CPU 351.

For example, an editing process of producing a sales slip by the slip producing server, an embodiment of which has been described above with reference to FIG. 1, may be performed on the display 354.

A hard disk 355 is a secondary storage device and stores the job log information and the counter information that have been collected from the image forming apparatuses 100 to 102, as well as information of the produced slips.

The counter collection server 104 and the job log collection server 105 may be connected through a network interface (NET/IF) 356 to the network to which the image forming apparatuses 100 to 102 are connected, and to the network to which the slip producing server 106 is connected. An input unit 357 is made up of, e.g., a keyboard and a mouse.

Figure 5:
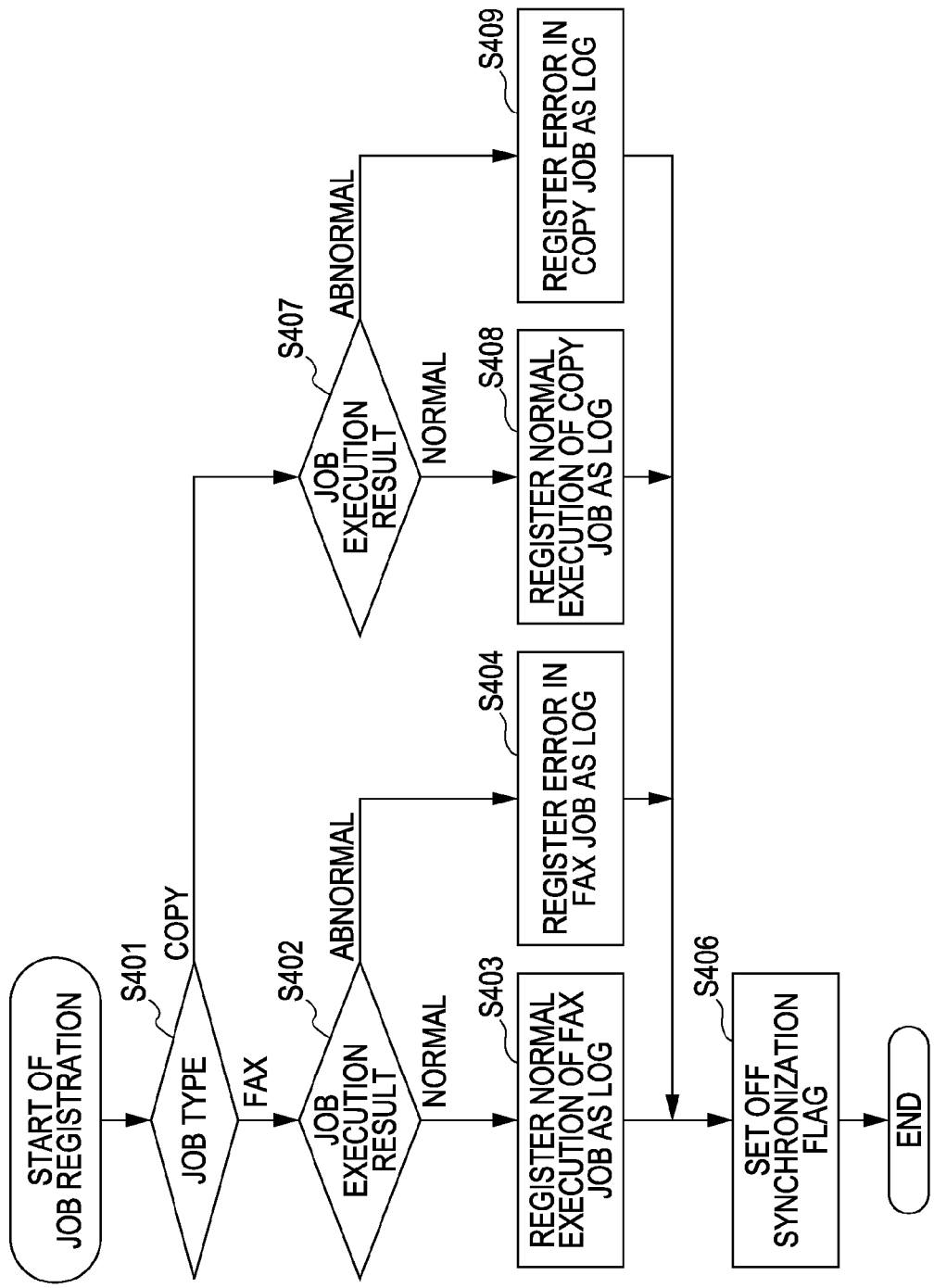
FIG. 5 is a flowchart of an embodiment of a process of registering job log information in the image forming apparatus.

FIG. 5 is a flowchart according to an embodiment of a program for implementing a process of storing the job log information 144 that is related to the usage of services and is generated with a user operating the image forming apparatus 100. The process of storing the job log information may be executed in accordance with the program stored in the ROM 131 while the RAM 132 is used as a work memory.

First, the type of job (service) provided to the user in the image forming apparatus is determined (S401).

If the job type is determined to be the FAX job, an execution result of the FAX job is determined (S402). If the job type is determined to be the copy job, an execution result of the copy job is determined (S407).

If the execution result of the FAX job is determined to be normal in S402, the normal execution of the FAX job is registered, as a log, in the FAX job log information along with the date, etc. (S403).

On the other hand, if the execution result of the FAX job is determined to be abnormal in S402, the occurrence of an error in the FAX job is registered, as a log, in the FAX job log information along with the date, etc. (S404).

A synchronization flag 108 (see FIG. 6) for each of the logs, which have been registered in the FAX job log information in steps S403 and S404, is set to be invalid (OFF) (S406), and the processing is brought to an end.

If the execution result of the copy job is determined to be normal in S407, the normal execution of the copy job is registered, as a log, in the copy job log information along with the date, etc. (S408).

On the other hand, if the execution result of the copy job is determined to be abnormal in S407, the occurrence of an error in the copy job is registered, as a log, in the copy job log information along with the date, etc. (S409).

The synchronization flag 108 for each of the logs, which have been registered in the copy job log information in steps S408 and S409, is set off (S406), and the processing is brought to an end.

Further, at the timing when the job (service) is executed in S401, a counter value of the counter information corresponding to each relevant service is counted up. In other words, as a consumable is consumed with the execution of the service, the counter information is integrated and updated. In this exemplary embodiment, the counter information is updated on the basis of the consumption of a consumable (e.g., a sheet), which depends on the usage of the service, by for example detecting the sheet with a sensor at the timing when it is ejected or supplied. Even if any error occurs, the counter information is updated corresponding to the detection result of the sensor.

FIG. 6 is a table illustrating an embodiment of a process of registering information, as a log, in the job log information in the image forming apparatus. The job log information may be managed by using a memory called a ring buffer. "Receipt NO", "DATE", "TIME", "TYPE" and "RESULT" are included in the job log information as management items.

The synchronization flag 108 is set to be valid (ON) for the log which has already been registered in the job log information at a time when the counter information 143 was transmitted to the counter collection server 104. On the other hand, the log for which the synchronization flag 108 is set off represents the log that was not yet registered at the time when the counter information was last collected. Stated another way, the synchronization flag 108 is set on in the job log information for the log corresponding to the counter information that has already been transmitted to the counter collection server 104.

Details of a process of setting on the synchronization flag 108 corresponding to the transmission of the counter information will be described later with reference to FIG. 9.

In this exemplary embodiment, a memory used for managing the job log information has a fixed size, and after a certain amount of logs have been written, the latest log is registered with overwriting of the old log. A log 510 represents the log which was the latest at the time when the counter information 143 was last transmitted to the counter collection server 104. Control for determining an area where logs are registered with overwriting is executed on the basis of information regarding the position of the log 510. When further jobs are executed, logs are registered in the order of 512, 513, 514, . . . , 517. When the next succeeding job is executed, the registration area is returned to an upper end and the job log information is registered in 502 with overwriting.

With the above-described processing, the job log information can be managed by using limited resources, i.e., a fixed memory size. This may cut costs and provide an environment in which the hard disk 137 may be kept from becoming full.

FIG. 7 illustrates an embodiment of information that is prepared as a job log information file 551 for the month of June, for example, by extracting logs from the job log information on the time serial basis, which is managed by using the ring buffer as illustrated in FIG. 6.

The oldest log in the job log information managed by using the ring buffer as illustrated in FIG. 6 is a log 505. Therefore, the log 505 is first obtained and written at the head of the job log information file 551 in the hard disk 137. Then, logs are obtained in the order of 506, 507, 508, . . . , 517, 502, 503 and 504 and are successively written in the job log information file 551.

The job log information file 551 is transmitted to the job log collection server 105 and is held in the hard disk 355.

Figure 8:
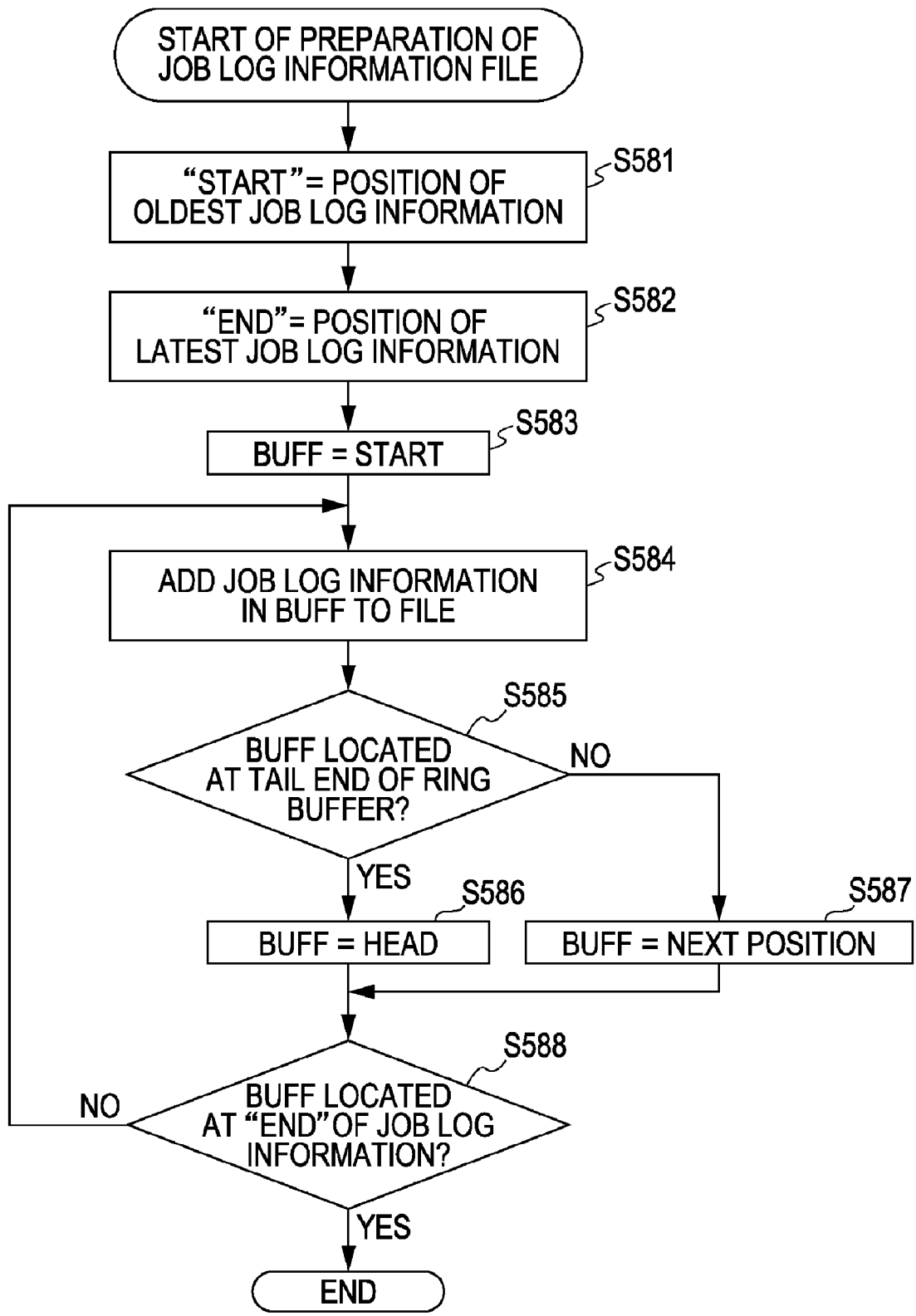
FIG. 8 is a flowchart of an embodiment of a process of preparing the job log information file based on the job log information that is managed by using the ring buffer.

FIG. 8 is a flowchart according to an embodiment of a program for implementing a process of preparing the job log information file 551, shown in FIG. 7, in the image forming apparatus. The process of preparing the job log information file 551 is executed by the CPU in accordance with the program stored in the ROM 131 while the RAM 132 is used as a work memory.

The oldest log in the job log information managed by using the ring buffer is detected and a corresponding pointer value of the ring buffer is obtained as "START" (S581). Then, the latest log in the job log information managed by using the ring buffer is detected and a corresponding pointer value of the ring buffer is obtained as "END" (S582).

Thereafter, a log corresponding to the pointer value of the ring buffer, which is designated by "START" is loaded into a buffer (BUFF) serving as the work memory (S583). The log loaded into the BUFF is added to the job log information file 551 (S584).

It is determined whether the log loaded into the BUFF in S583 is located at a tail end 517 of the ring buffer (S585). If the determination result indicates that the log loaded in S583 is located at the tail end 517 of the ring buffer (YES in S585), a log located at the head of the ring buffer is loaded into the BUFF (S586) and the processing advances to S588. On the other hand, if the determination result indicates that the loaded job log information is not information located at the tail end 517 of the ring buffer (NO in S585), a next log is loaded into the BUFF (S587) and the processing advances to S588.

In S588, it is determined whether the log loaded in S586 or S587 is a log corresponding to the pointer value of "END". If the determination result indicates that the information in the BUFF is the log corresponding to the pointer value of "END" (YES in S588), the job log loaded into the BUFF is added to the job log information file (S589) and the processing is brought to an end. On the other hand, if the determination result indicates that the information in the BUFF is not the log corresponding to the pointer value of "END" (NO in S588), the processing is returned to S584.

Figure 9:
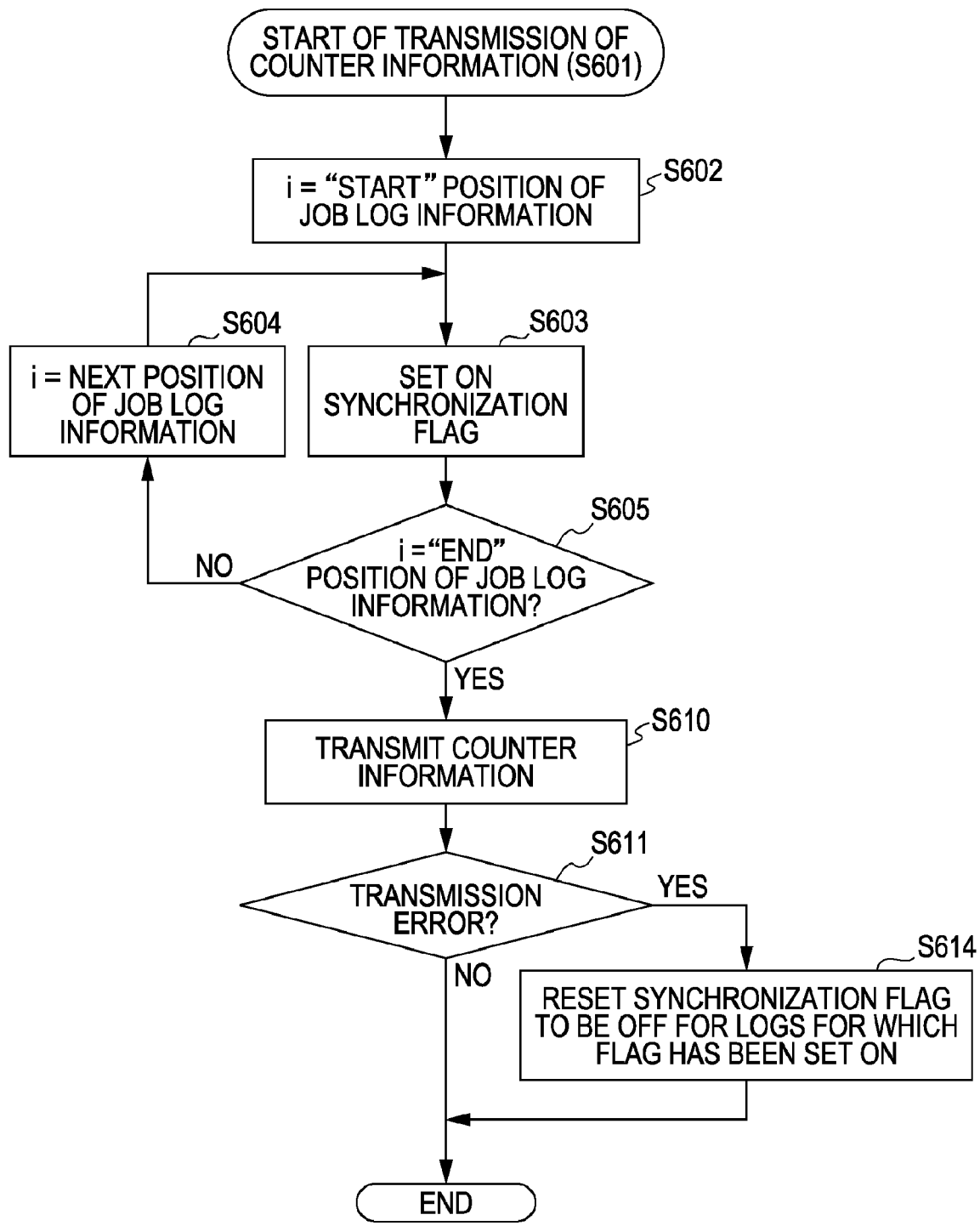
FIG. 9 is a flowchart of an embodiment of a process of setting a synchronization flag to be valid (ON) when the counter information is transmitted in the image forming apparatus.

FIG. 9 is a flowchart according to an embodiment of a program for implementing a flag setting process of transmitting the counter information 143 to the counter collection server 104 in the image forming apparatus and setting an area of the synchronization flag to be valid (ON) for the job log information that is registered in the ring buffer.

In processing of S602 to S605, the synchronization flag is set on with respect to the ring buffer for managing the job log information. The flag setting process is executed by the CPU in accordance with the program stored in the ROM 131 while the RAM 132 is used as a work memory.

The pointer value corresponding to the head of the ring buffer for the job log information, i.e., 502 in FIG. 6, is set to i that is a parameter set in the work memory (S602).

After the processing in S602, the synchronization flag 108 for the log in the job log information, which is indicated by i, is set on (S603).

After the processing in S603, it is determined whether the log in the job log information, which is indicated by i, is information located at the tail end 517 of the ring buffer in FIG. 6 (S605).

If the relevant log is determined to be not located at the tail end of the ring buffer (NO in S605), the position of a next log adjacent in the job log information is set to i (S604) and the processing is returned to S603.

If it is determined that the position indicated by the current i corresponds to the information located at the tail end 517 of the ring buffer (i.e., "END" of the job log information) (YES in S605), the counter information is transmitted to the counter collection server 104 (S610).

After transmitting the counter information in S610, whether a transmission error has occurred is determined (S611).

If the determination result in S611 indicates that a transmission error has occurred (YES in S611), the processing advances to S614. If the determination result in S611 indicates that no transmission error has occurred and the counter information has been normally transmitted (NO in S611), the processing is brought to an end.

In S614, the synchronization flag 108 is reset to be invalid (OFF). The reason resides in preventing false information from being set in the job log information to indicate that the corresponding counter information is already transmitted in spite of the counter information 143 being not yet transmitted to the counter collection server 104.

The process shown in FIG. 9 may be executed for the job log information and the counter information for each of the services, such as the copy service and the FAX service, which are provided by the image forming apparatus.

Figure 10:
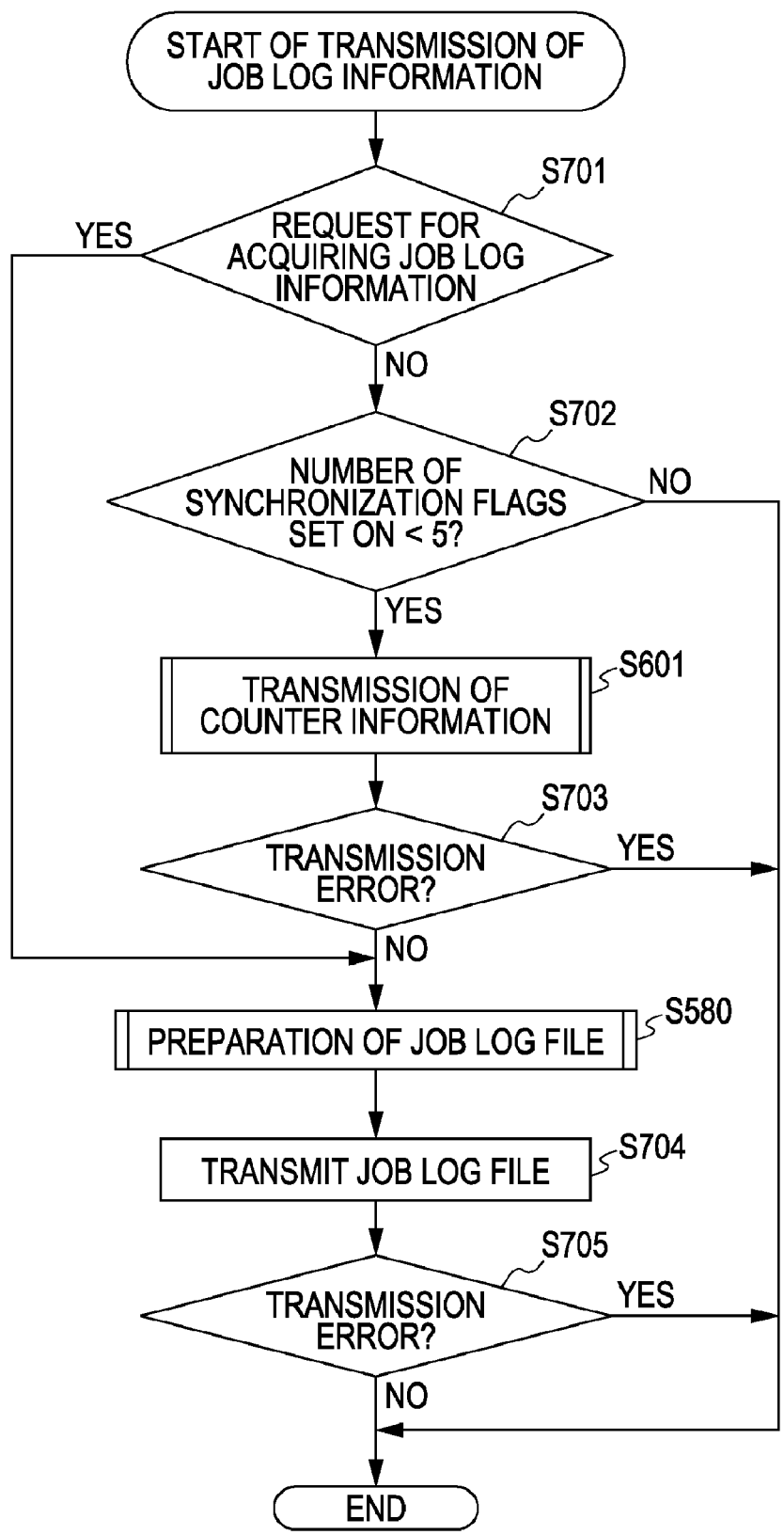
FIG. 10 is a flowchart of an embodiment of a process executed when the job log information is transmitted in the image forming apparatus.

FIG. 10 is a flowchart according to an embodiment of a program for implementing a process of transmitting the job log information to the job log collection server 105 in the image forming apparatus. This process is executed by the CPU in accordance with the program stored in the ROM 131 while the RAM 132 is used as a work memory.

There are two cases, i.e., one where job log transmission is executed in response to a job log acquisition request from the job log collection server 105, and the other where job log transmission is executed from the image forming apparatus without the acquisition request. The reason why the job log transmission is executed without the acquisition request resides in accumulating the not-yet-transmitted logs, for which the synchronization flag 108 is set off, in the job log collection server 105 beforehand to prevent those logs from being overwritten with logs which are generated by newly executed services (such as copy jobs). The timing of transmitting the job log information from the image forming apparatus by itself is set to the timing prior to when the number of logs for which the synchronization flag 108 is set on becomes 0 (e.g., the timing when it is reduced to 5 or below).

It is determined whether a request for acquiring the job log information is sent from the job log collection server 105 (S701). If the determination result indicates that there is no request (NO in S701), the processing advances to S702. On the other hand, if the determination result in S701 indicates that there is a request (YES in S701), the processing advances to S580.

It is determined in S702 that the count number of logs in the job log information, for which the synchronization flag 108 is set on, is reduced to 5 or below (YES in S702), the counter information is transmitted (S601).

It is determined in S702 that the count number of logs in the job log information managed by using the ring buffer, for which the synchronization flag 108 is set on, is not reduced to 5 or below (NO in S702), the processing is brought to an end.

Then, whether a transmission error has occurred in the counter information transmitting process in S601 is determined (S703).

If the determination result indicates that no transmission error has occurred (NO in S703), the job log information file is prepared (S580) as described above with reference to FIG. 8, and the job log information is transmitted to the job log collection server 105 (S704).

If the determination result in S703 indicates that a transmission error has occurred in the counter information transmitting process (YES in S703), the processing is brought to an end.

After transmitting the job log information in S704, it is determined whether a transmission error has occurred (S705). If the determination result in S705 indicates that a transmission error has occurred (YES in S705), the processing is brought to an end. Also, if the determination result in S705 indicates that no transmission error has occurred and the job log information has been normally transmitted (NO in S705), the processing is brought to an end.

In the case of executing the above-described process upon receiving the request for acquiring the job log information from the job log collection server 105, if a transmission error has occurred, the occurrence of the transmission error is notified in reply to the request. Herein, the ID information specific to the image forming apparatus, the model name and the installation site thereof, as well as the state of the image forming apparatus (including the error status) are also notified at the same time.

The process shown in FIG. 10 may be executed for the job log information and the counter information for each of the services, such as the copy service and the FAX service, which are provided by the image forming apparatus.

An embodiment for a method of management of the log information per month by the job log collection server 105 will be described below.

FIG. 11A illustrates an embodiment of a job log information file 801 acquired by the job log collection server 105 from the image forming apparatus at the time when sales information of the month of May is calculated. Logs 850 to 852 correspond to information of the services executed in April, logs 853 to 859 correspond to information of the services executed in May, and logs 860 to 862 correspond to information of the services executed in June.

FIG. 11B illustrates an embodiment of a job log information file 802 acquired by the job log collection server 105 from the image forming apparatus at the time when sales information of the month of June is calculated. Logs 857 to 859 correspond to information of the services executed in May, logs 860 to 866 correspond to information of the services executed in June, and logs 867 to 869 correspond to information of the services executed in July.

FIG. 11C illustrates an embodiment of a job log real file 803 of June, which is prepared by the job log collection server 105 by comparing the logs in the job log information files and the synchronization flags 108 between FIGS. 11A and 11B.

The job log information file 802 acquired by the job log collection server 105 from the image forming apparatus includes logs ranging over a plurality of months, i.e., May, June and July. Logs 858 and 859 correspond to information of the services executed in May, logs 860 to 866 correspond to information of the services executed in June, and a log 867 corresponds to information of the service executed in July.

FIG. 11D illustrates an embodiment of information of the service having the execution result not normally completed, which is extracted from the job log real file 803, shown in FIG. 11C, by the job log collection server 105. In other words, FIG. 11D illustrates a deduction target list file 804 of June prepared by extracting the log which has caused an error due to, e.g., a paper jam and which is to be deducted from billing. Job log information 862 is information that has been executed in June, but that has not been normally completed.

Figure 12:
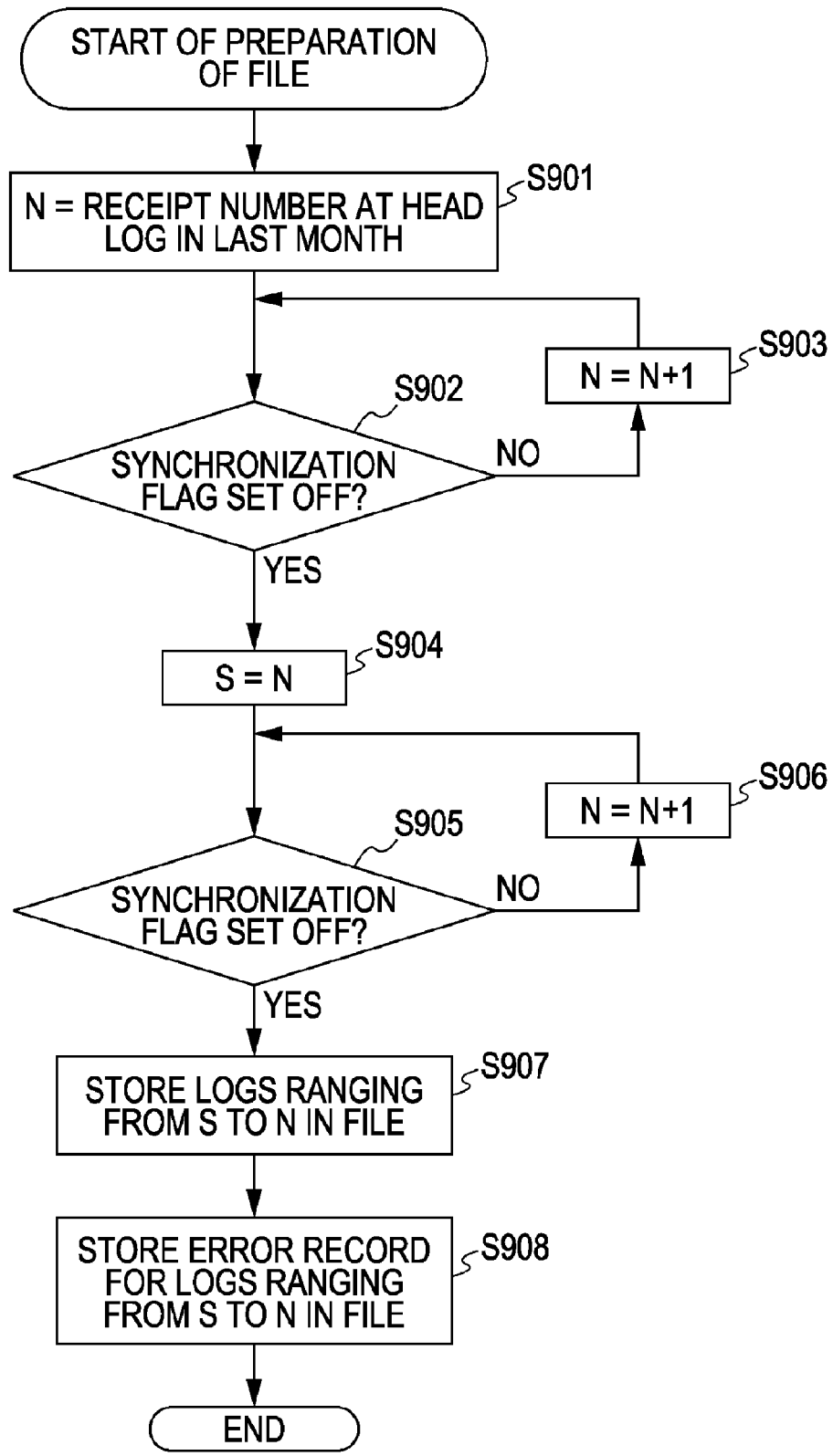
FIG. 12 is a flowchart of an embodiment of a process of preparing the job log real file and the deduction target list file of June.

FIG. 12 is a flowchart according to an embodiment of a program for implementing a process of preparing the job log real file by the slip producing server 106. This process is executed by the CPU in accordance with the program stored in the ROM 131 while the RAM 132 is used as a work memory.

In S901 to S904, from the job log information file acquired in the last month (e.g., May), the first log in June is extracted on the basis of the synchronization flag 108.

In S905 and S906, from the job log information file acquired in this month (e.g., June), the last log in June is extracted on the basis of the synchronization flag 108.

The receipt number (5100) of the start (head) log in May is acquired from the job log information file 801 of May and is set to a receipt number N (S901).

After acquiring the receipt number N in S901, the log corresponding to the receipt number N is acquired from the job log information file 801 of May, and whether the synchronization flag 108 is set off for the information of the relevant log is determined (S902). If the determination result indicates that the synchronization flag 108 is set off for the information of the relevant log (YES in S902), the receipt number N is set to a receipt number S (S904). The receipt number S represents a start position of the logs in June.

On the other hand, if the determination result in S903 indicates that the synchronization flag 108 is not set off for the information of the relevant log (NO in S902), the receipt number N is set to a value incremented by 1 (S903) and the processing is returned to S902.

After setting the receipt number N to the receipt number S in S904, the log corresponding to the receipt number N is acquired from the job log information file 802 of June, and whether the synchronization flag 108 is set off for the information of the relevant log is determined (S905).

If the determination result indicates that the synchronization flag 108 is set off for the information of the relevant log (YES in S905), the logs ranging from the receipt number S to the receipt number N are extracted from the job log information file and are written in the job log real file 803 of June (S907).

On the other hand, if the determination result in S905 indicates that the synchronization flag 108 is not set off for the information of the relevant log (NO in S905), the receipt number N is set to a value incremented by 1 (S906) and the processing is returned to S905.

After preparing the job log real file 803 of June in S907, the log among the job log real file 803 of June, for which the job execution result is abnormal, is stored in the deduction target list file 804 in the current month (S908). The processing is thereby brought to an end.

FIG. 13 illustrates an embodiment of an editing screen for producing a sales slip by the slip producing server 106 in the image forming apparatus.

A sales slip editing screen 1001 is made up of a display section 1034 for the job log real file of June, for example, and a sales slip editing section 1035.

The display section 1034 for the job log real file of June is made up of a display area 1002 for the FAX job-log real file of June and a display area 1003 for the copy job-log real file of June. The display area 1002 for the FAX job-log real file of June is an area for displaying the jog log real file 803 of June regarding the FAX service, and the display area 1003 for the copy job-log real file of June is an area for displaying the job log real file 803 of June regarding the copy service.

The sales slip editing section 1035 may include not only an editing area and a display area for information used to calculate the amount billed per job, but also an area for displaying the total amount billed for all the jobs. The jobs include, e.g., the FAX job and the copy job herein, but they may also include other services that can be provided by the image forming apparatus.

The FAX job may include ordinary sending 1022, toll-free sending 1023, and oversea sending (country number 1) 1024. The copy job may include color (small) 1025, color (large) 1026, monochrome (small) 1027, and monochrome (large) 1028.

Items of the information used to calculate the amount billed may be made up of a "this time" column 1016, a "last time" column 1017, a number-of-uses column 1018, a deduction column 1019, a unit price column 1020, a charge column 1021, and a "TOTAL" display column 1031.

The "this time" column 1016 has a FAX counter information display column 1004 for this month (June), which displays a numerical value of the FAX counter information acquired this time, and a copy counter information display column 1005 for this month (June), which displays a numerical value of the copy counter information acquired this time.

The "last time" column 1017 has a FAX counter information display column 1006 for the last month (May), which displays a numerical value of the FAX counter information acquired the last time, and a copy counter information display column 1007 for the last month (May), which displays a numerical value of the copy counter information acquired the last time.

The number-of-uses column 1018 is made up of a FAX number-of-uses display column 1008 and a copy number-of-uses display column 1009. The FAX number-of-uses display column 1008 displays the difference between numerical values in the FAX counter information display column 1004 for June and the FAX counter information display column 1006 for May. The copy number-of-uses display column 1009 displays the difference between numerical values in the copy counter information display column 1005 for June and the copy counter information display column 1007 for May.

The deduction column 1019 is made up of a FAX-job deduction input/display column 1010 and a copy-job deduction input/display column 1011. The FAX-job deduction input/display column 1010 is an area which displays a deduction number per type of FAX job and which enables the displayed number to be edited.

The copy-job deduction input/display column 1011 is an area which displays a deduction number per type of copy job and which enables the displayed number to be edited.

The unit price column 1020 is made up of a FAX-job unit price display column 1012 and a copy-job unit price display column 1013. The FAX-job unit price display column 1012 displays a unit price per type of FAX job.

The copy-job unit price display column 1013 displays a unit price per type of copy job.

The charge column 1021 is made up of a FAX detailed charge display column 1014, a copy detailed charge display column 1015, a FAX subtotal display column 1029, and a copy subtotal display column 1030. The FAX detailed charge display column 1014 displays the amount billed per type of FAX job. The copy detailed charge display column 1015 displays the amount billed per type of copy job. The FAX subtotal display column 1029 displays the total amount billed for all the FAX jobs, which are displayed in the FAX detailed charge display column 1014. The copy subtotal display column 1030 displays the total amount billed for all the copy jobs, which are displayed in the copy detailed charge display column 1015.

The "TOTAL" display column 1031 displays a total of the amounts billed in the FAX subtotal display column 1029 and the copy subtotal display column 1030.

A print button 1032 is used to print, as a report, the details displayed in the sales slip editing section 1035 on paper. An end-of-edit button 1033 is used to transmit the details displayed in the sales slip editing section 1035 to the billing server 109.

Figure 14:
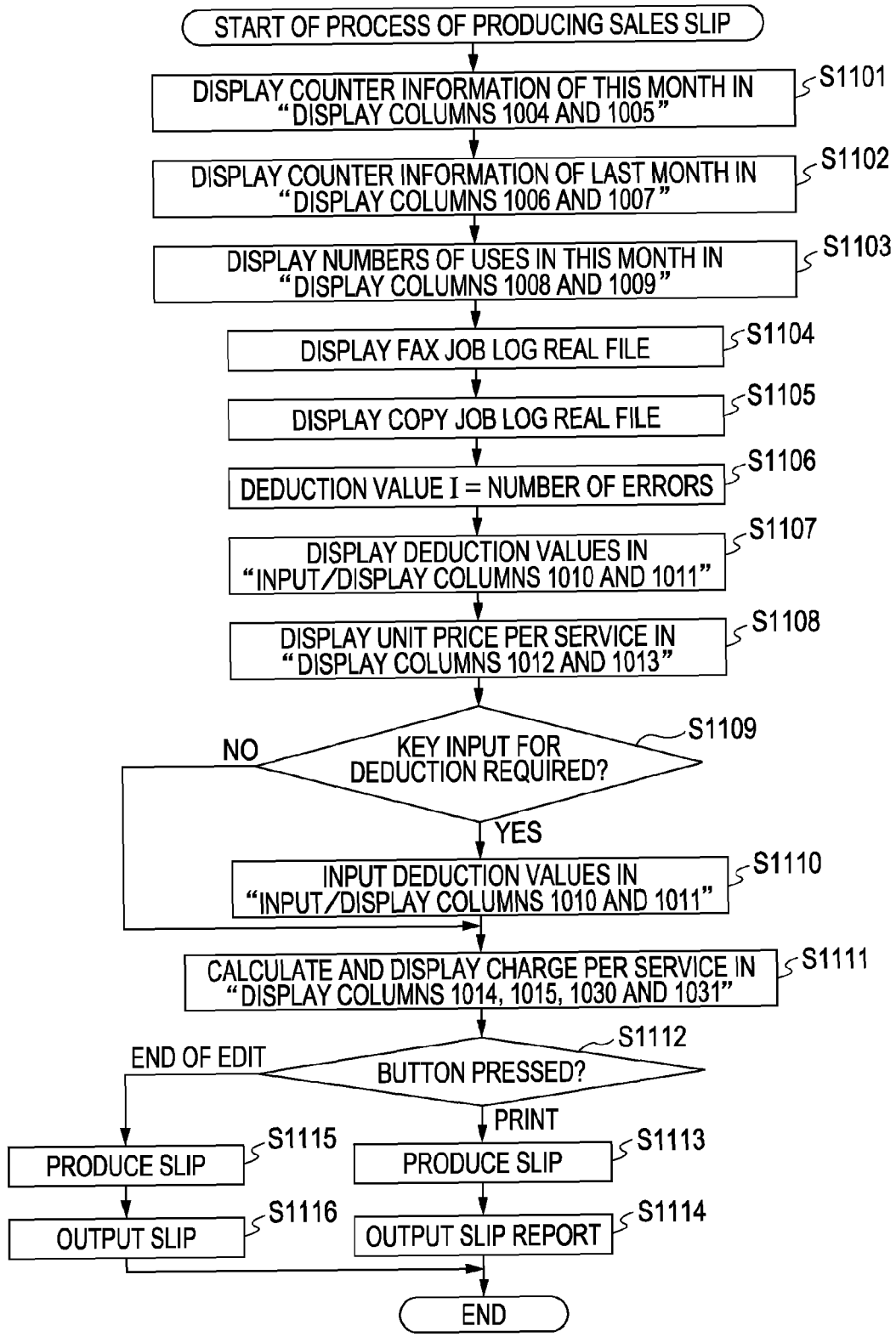
FIG. 14 is an embodiment of a flowchart of a process of producing a slip on the sales slip editing screen.

FIG. 14 is a flowchart according to an embodiment of a program for implementing a process of producing a slip from the editing screen, shown in FIG. 13, by the slip producing server 106. This process is executed by the CPU in accordance with the program stored in the ROM 131 while the RAM 132 is used as a work memory.

With respect to the "this time" column 1016, the acquired FAX counter information of June is displayed in the FAX counter information display column 1004 for June, and the acquired copy counter information of June is displayed in the copy counter information display column 1005 for June (S1101).

After the processing of S1101, with respect to the "last time" column 1017, the acquired FAX counter information of May is displayed in the FAX counter information display column 1006 for May, and the acquired copy counter information of May is displayed in the copy counter information display column 1007 for May (S1102).

After the processing of S1102, a display process is executed for the FAX number-of-uses display column 1008 and the copy number-of-uses display column 1009 of the number-of-uses column 1018 (S1103). More specifically, the difference between numerical values in the FAX counter information display column 1004 for June and the FAX counter information display column 1006 for May is displayed in the FAX number-of-uses display column 1008. The difference between numerical values in the copy counter information display column 1005 for June and the copy counter information display column 1007 for May is displayed in the copy number-of-uses display column 1009.

After the processing of S1103, details of the FAX service prepared as the job log real file of June in S907 in the flowchart of FIG. 12 are displayed in the FAX-job log real file display area 1002 for June (S1104).

After the processing of S1104, details of the copy service prepared as the job log real file of June in S907 in the flowchart of FIG. 12 are displayed in the copy-job log real file display area 1003 for June (S1105).

After the processing of S1105, the number of errors in the FAX job is counted from the details of the FAX-job deduction target list file of June, which has been prepared in S908 in the flowchart of FIG. 12 (S1106). Also, the number of errors in the copy job is counted from the details of the copy-job deduction target list file of June, which has been prepared in S908 in the flowchart of FIG. 12 (S1106).

After the processing of S1106, with respect to the deduction column 1019, the number of errors in the FAX job is displayed in the FAX-job deduction input/display column 1010 (S1107). Also, the number of errors in the copy job is displayed in the copy-job deduction input/display column 1011 (S1107). While the number of errors is displayed in the illustrated example, a predetermined proportion of the number of uses may be displayed instead of the number of errors.

After the processing of S1107, with respect to the unit price column 1020, the unit price information of the FAX service is displayed in the FAX-job unit price display column 1012 and the unit price information of the copy service is displayed in the copy-job unit price display column 1013 (S1108).

After the processing of S1108, it is determined in S1109 whether a key input for deduction is appropriate (S1109). If the determination result indicates that the key input is appropriate (YES in S1109), respective deduction values are input in the FAX-job deduction input/display column 1010 and the copy-job deduction input/display column 1011 (S1110).

On the other hand, the determination result in S1109 indicates that the key input is not appropriate (NO in S1109), the processing advances to S1111.

After the processing of S1110, the charges for the FAX services are displayed in the FAX detailed charge display column 1014 and the subtotal of the charges is displayed in the FAX subtotal display column 1029 (S1111). Also, the charges for the copy services are displayed in the copy detailed charge display column 1015 and the subtotal of the charges is displayed in the copy subtotal display column 1030 (S1111). Then, the total of numerical values in the FAX subtotal display column 1029 and the copy subtotal display column 1030 are displayed in the "TOTAL" display column 1031 (S1111).

After the display processing of S1111, which one of the button is pressed is determined (S1112). If the determination result indicates that the print button is pressed, a slip is produced (S1113) and a process of outputting details of the slip produced in S1113 as a report is executed (S1114). The processing is then brought to an end. On the other hand, the determination result indicates that the end-of-edit button is pressed, a slip is produced (S1115) and the produced slip is transmitted to the billing server 109 (S1116). The processing is then brought to an end.

Figure 15:
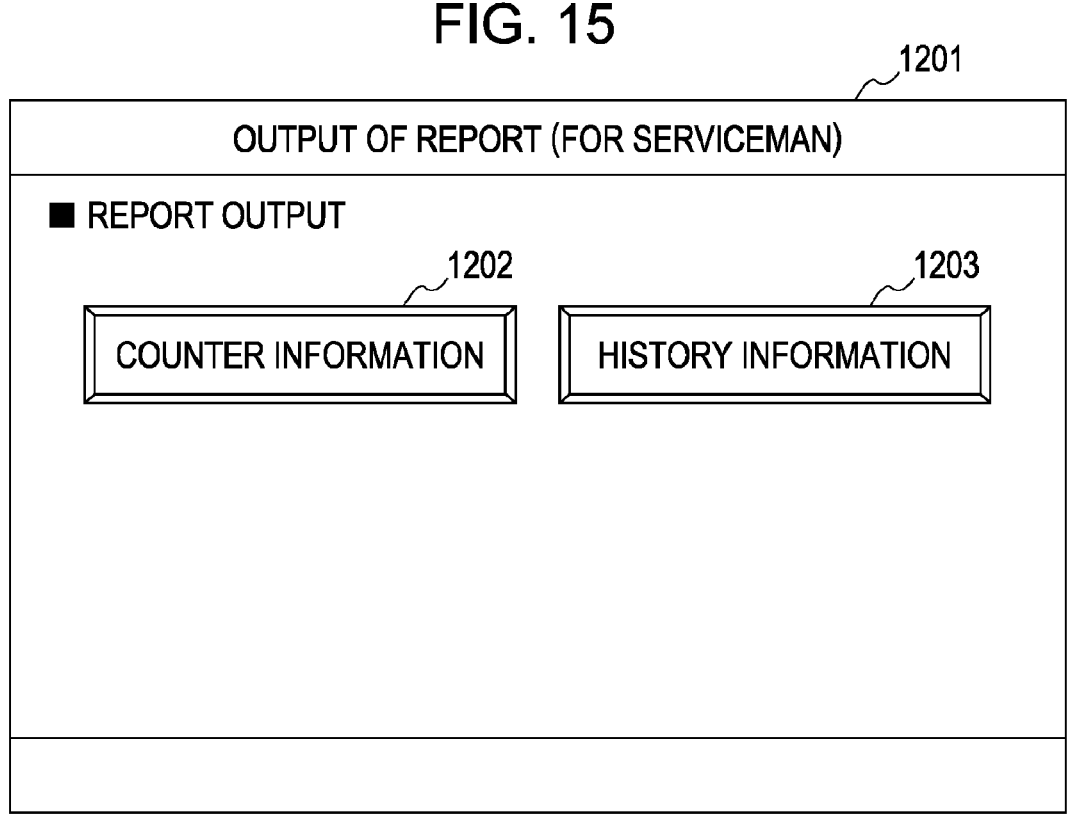
FIG. 15 illustrates an embodiment of an image of a screen prepared for editing and outputting a slip report and outputting a history report in an image forming apparatus.

FIG. 15 illustrates an embodiment of an image of a UI screen, including buttons in the screen, which is prepared for outputting reports of the counter information and the job log information in the image forming apparatus 102.

In one embodiment according to the present invention, a slip is produced in the image forming apparatus 102.

A report output screen 1201 includes a counter information button 1202 and a history information button 1203. The counter information button 1202 is used to display a sales slip editing screen 1221 as shown in FIG. 19 and to output a sales slip report, shown in FIG. 20A, on the sales slip report. The history information button 1203 is used to output a job log information report 1340 shown in FIG. 20B.

FIG. 16 illustrates an embodiment of an image of one embodiment of a process for managing the job log information, i.e., job history, by using a memory of a ring buffer in the image forming apparatus 102 as with the job log information shown in FIG. 6.

Numeral 4 registered in the column of the synchronization flag 108 represents logs which are acquired as sales in April and which correspond to 1253 and 1254.

Numeral 5 registered in the column of the synchronization flag 108 represents logs which are acquired as sales in May and which correspond to 1255 to 1258.

Numeral 6 registered in the column of the synchronization flag 108 represents logs which are acquired as sales in June and which correspond to 1259 to 1265 and 1250 to 1252.

Embodiment of files as illustrated in FIGS. 17A, 17B and 17C may have the same formats as those collected from the image forming apparatus described above, as can be readily understood by comparison.

FIG. 17A illustrates an embodiment of a counter information file 1300 of June, which is acquired in the image forming apparatus at the time when the counter information button 1202, shown in FIG. 15, is pressed. The counter information file 1300 is made up of FAX counter information 1301 and copy counter information 1302.

The FAX counter information 1301 includes counter information with respect to, for example, ordinary sending 1022, toll-free sending 1023, and oversea sending (country number 1) 1024. The copy counter information 1302 includes counter information with respect to, for example, color copy (small) 1025, color copy (large) 1026, monochrome copy (small) 1027, and monochrome copy (large) 1028.

FIG. 17B illustrates an embodiment of a FAX job log real file 1310 of June, which is acquired in the image forming apparatus at the time when the counter information button 1202, shown in FIG. 15, is pressed. FIG. 17C illustrates an embodiment of a copy job log real file 1320 of June, which is acquired in the image forming apparatus at the time when the counter information button 1202, shown in FIG. 15, is pressed. The job log real files prepared in the image forming apparatus, shown in FIGS. 17B and 17C, are prepared in accordance with the same flowchart as that shown in FIG. 12.

Figure 18:
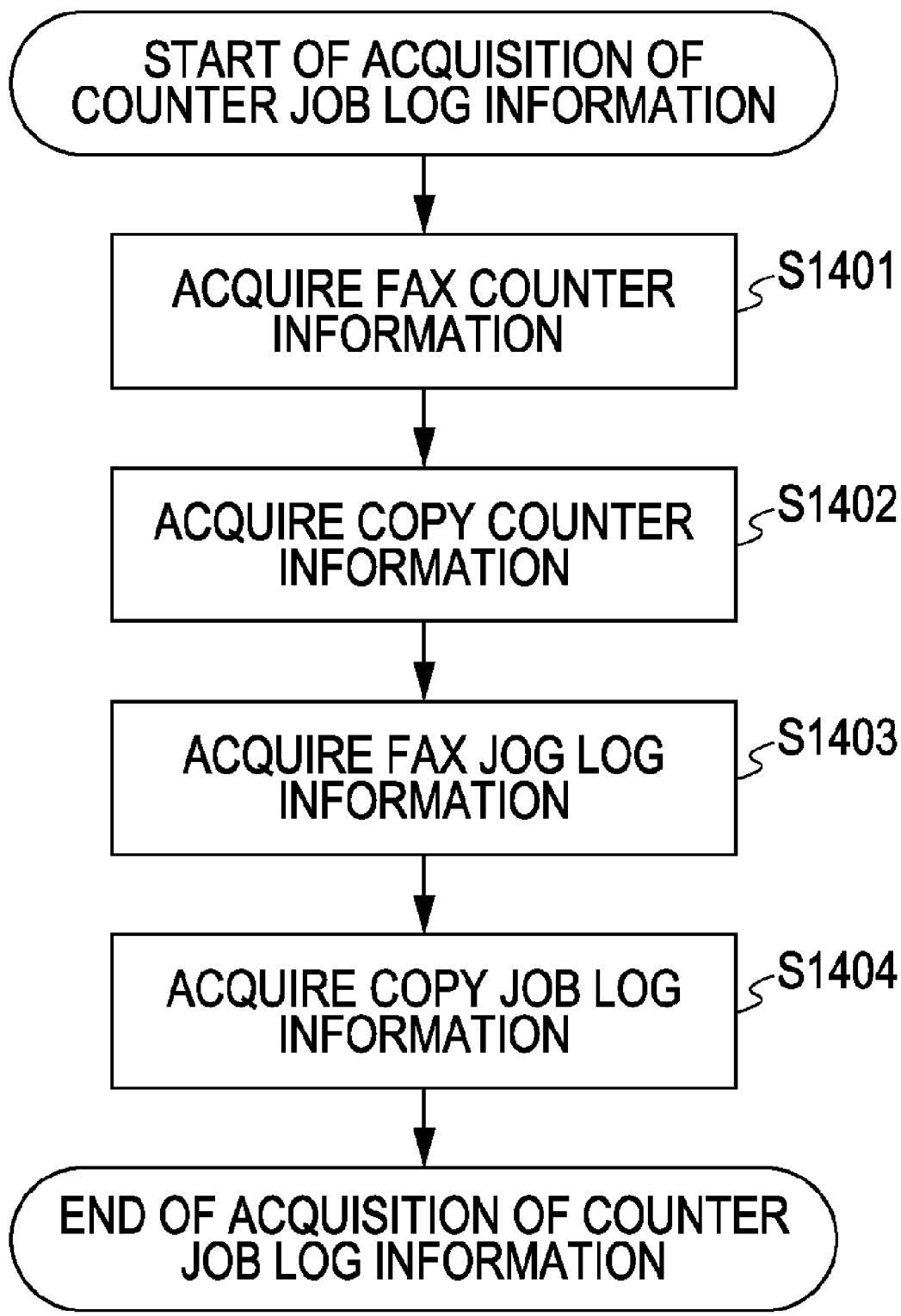
FIG. 18 is a flowchart of an embodiment of a process of obtaining information displayed on an editing screen of FIG. 19.

FIG. 18 is a flowchart according to one embodiment of a program for implementing a counter job log acquiring process of acquiring the counter information and the job log information in the image forming apparatus at the time when the counter information button 1202 is pressed. This process is executed by the CPU in accordance with the program stored in the ROM 131 while the RAM 132 is used as a work memory.

In other words, when a slip is produced in the image forming apparatus 102, similar information to that of the files collected from the image forming apparatus 100 in the embodiment described above may also be provided.

The FAX counter information is acquired and stored in a hard disk 137 (S1401). After the processing of S1401, the copy counter information is acquired and stored in the hard disk 137 (S1402). After the processing of S1402, the FAX job log information is acquired and stored in the hard disk 137 (S1403). After the processing of S1403, the copy job log information is acquired and stored in the hard disk 137 (S1404).

FIG. 19 illustrates an embodiment of a screen for editing a sales slip in the image forming apparatus 102.

While the files collected from the image forming apparatus 100 in the embodiment described above may be edited with reference to FIG. 13, the image forming apparatus 102 can also locally perform editing in a similar manner.

A sales slip editing section 1221 can include not only an editing area and a display area for information used to calculate the amount billed per job, but also an area for displaying the total amount billed for all the jobs. The jobs include, e.g., the FAX job and the copy job herein.

The FAX job can include, for example, ordinary sending 1022, toll-free sending 1023, and oversea sending (country number 1) 1024. The copy job can include, for example, color (small) 1025, color (large) 1026, monochrome (small) 1027, and monochrome (large) 1028.

Items of the information used to calculate the amount billed can be made up of a "this time" column 1016, a "last time" column 1017, a number-of-uses column 1018, a deduction column 1019, a unit price column 1020, a charge column 1021, and a "TOTAL" display column 1031.

The "this time" column 1016 has a FAX counter information display column 1004 for this month (June), which displays a numerical value of the FAX counter information acquired this time, and a copy counter information display column 1005 for this month (June), which displays a numerical value of the copy counter information acquired this time.

The "last time" column 1017 has a FAX counter information display column 1006 for the last month (May), which displays a numerical value of the FAX counter information acquired the last time, and a copy counter information display column 1007 for the last month (May), which displays a numerical value of the copy counter information acquired the last time.

The number-of-uses column 1018 is made up of a FAX number-of-uses display column 1008 and a copy number-of-uses display column 1009.

The FAX number-of-uses display column 1008 displays the difference between numerical values in the FAX counter information display column 1004 for June and the FAX counter information display column 1006 for May. The copy number-of-uses display column 1009 displays the difference between numerical values in the copy counter information display column 1005 for June and the copy counter information display column 1007 for May.

The deduction column 1019 is made up of a FAX-job deduction input/display column 1010 and a copy-job deduction input/display column 1011. The FAX-job deduction input/display column 1010 is an area which displays a deduction number per FAX job and which enables the displayed number to be edited. The copy-job deduction input/display column 1011 is an area which displays a deduction number per copy job and which enables the displayed number to be edited.

The unit price column 1020 is made up of a FAX-job unit price display column 1012 and a copy-job unit price display column 1013. The FAX-job unit price display column 1012 displays a unit price per FAX job. The copy-job unit price display column 1013 displays a unit price per copy job.

The charge column 1021 is made up of a FAX detailed charge display column 1014, a copy detailed charge display column 1015, a FAX subtotal display column 1029, and a copy subtotal display column 1030. The FAX detailed charge display column 1014 displays the amount billed per FAX job. The copy detailed charge display column 1015 displays the amount billed per copy job.

The FAX subtotal display column 1029 displays the total amount billed for all the FAX jobs, which are displayed in the FAX detailed charge display column 1014. The copy subtotal display column 1030 displays the total amount billed for all the copy jobs, which are displayed in the copy detailed charge display column 1015.

The "TOTAL" display column 1031 displays a total of the amounts billed in the FAX subtotal display column 1029 and the copy subtotal display column 1030.

A print button 1032 may be used to print, as a report, the details displayed in the sales slip editing screen 1221 on paper. An end button 1223 may be used to bring the editing screen to an end without printing the edited details as a report.

FIG. 20A illustrates an embodiment of a sales slip report 1330 of June (this month) prepared in the image forming apparatus 102.

The sales slip report 1330 of June (this month) includes a display area per job and an area for displaying the total amount billed for all the jobs.

The FAX job may include, for example, ordinary sending 1022, toll-free sending 1023, and oversea sending (country number 1) 1024. The copy job can include, for example, color (small) 1025, color (large) 1026, monochrome (small) 1027, and monochrome (large) 1028.

Items of the information used to calculate the amount billed may be made up of a "this time" column 1016, a "last time" column 1017, a number-of-uses column 1018, a deduction column 1019, a unit price column 1020, a charge column 1021, and a "TOTAL" display column 1031. The "this time" column 1016 has a FAX counter information display column 1004 for this month (June), which displays a numerical value of the FAX counter information acquired this time, and a copy counter information display column 1005 for this month (June), which displays a numerical value of the copy counter information acquired this time. The "last time" column 1017 has a FAX counter information display column 1006 for the last month (May), which displays a numerical value of the FAX counter information acquired the last time, and a copy counter information display column 1007 for the last month (May), which displays a numerical value of the copy counter information acquired the last time.

The number-of-uses column 1018 is made up of a FAX number-of-uses display column 1008 and a copy number-of-uses display column 1009. The FAX number-of-uses display column 1008 displays the difference between numerical values in the FAX counter information display column 1004 for June and the FAX counter information display column 1006 for May. The copy number-of-uses display column 1009 displays the difference between numerical values in the copy counter information display column 1005 for June and the copy counter information display column 1007 for May.

The deduction column 1019 is made up of a FAX-job deduction display column 1010 and a copy-job deduction display column 1011. The FAX-job deduction display column 1010 is an area which can display a deduction number per FAX job. The copy-job deduction input/display column 1011 is an area which can display a deduction number per copy job.

The unit price column 1020 is made up of a FAX-job unit price display column 1012 and a copy-job unit price display column 1013. The FAX-job unit price display column 1012 displays a unit price per FAX job. The copy-job unit price display column 1013 displays a unit price per copy job.

The charge column 1021 is made up of a FAX detailed charge display column 1014, a copy detailed charge display column 1015, a FAX subtotal display column 1029, and a copy subtotal display column 1030. The FAX detailed charge display column 1014 displays the amount billed per FAX job. The copy detailed charge display column 1015 displays the amount billed per copy job.

The FAX subtotal display column 1029 displays the total amount billed for all the FAX jobs, which are displayed in the FAX detailed charge display column 1014. The copy subtotal display column 1030 displays the total amount billed for all the copy jobs, which are displayed in the copy detailed charge display column 1015.

The "TOTAL" display column 1031 displays a total of the amounts billed in the FAX subtotal display column 1029 and the copy subtotal display column 1030.

FIG. 20B illustrates an embodiment of the job log information that is managed by using the ring buffer as illustrated in FIG. 16 and is prepared as a report.

The job log information is extracted on the time serial basis according to the algorithm shown in the flowchart of FIG. 8 to prepare a job log information file 1340 of June, which is displayed in the form of a report.

The synchronization flag 108 is made valid (ON) for all the logs in the job log information, as with the job log information denoted by 1250 to 1265 in FIG. 16, when the counter information 143 is printed. Stated another way, when a flag is set to be valid in the synchronization flag display area 1341, this indicates that the corresponding counter information is output as a sales slip. Also, when a flag is not set to be valid in the synchronization flag display area 1341, this indicates that the corresponding counter information is not output to the sales slip report.

When the synchronization flag 108 is valid, a mark "*" is displayed in the synchronization flag display area 1341.

In order that the user can easily confirm in which month the job log information is reported, when the synchronization flag 108 is set on, information specifying month may be added to indicate the relevant month in the synchronization flag display area 1341. For example, when the job log information corresponds to the sales in June, "6" is added to the mark "*" of the synchronization flag 108 and is displayed in the synchronization flag display area 1341. A detailed process of setting on the synchronization flag 108 will be described below with reference to FIG. 21.

Figure 21:
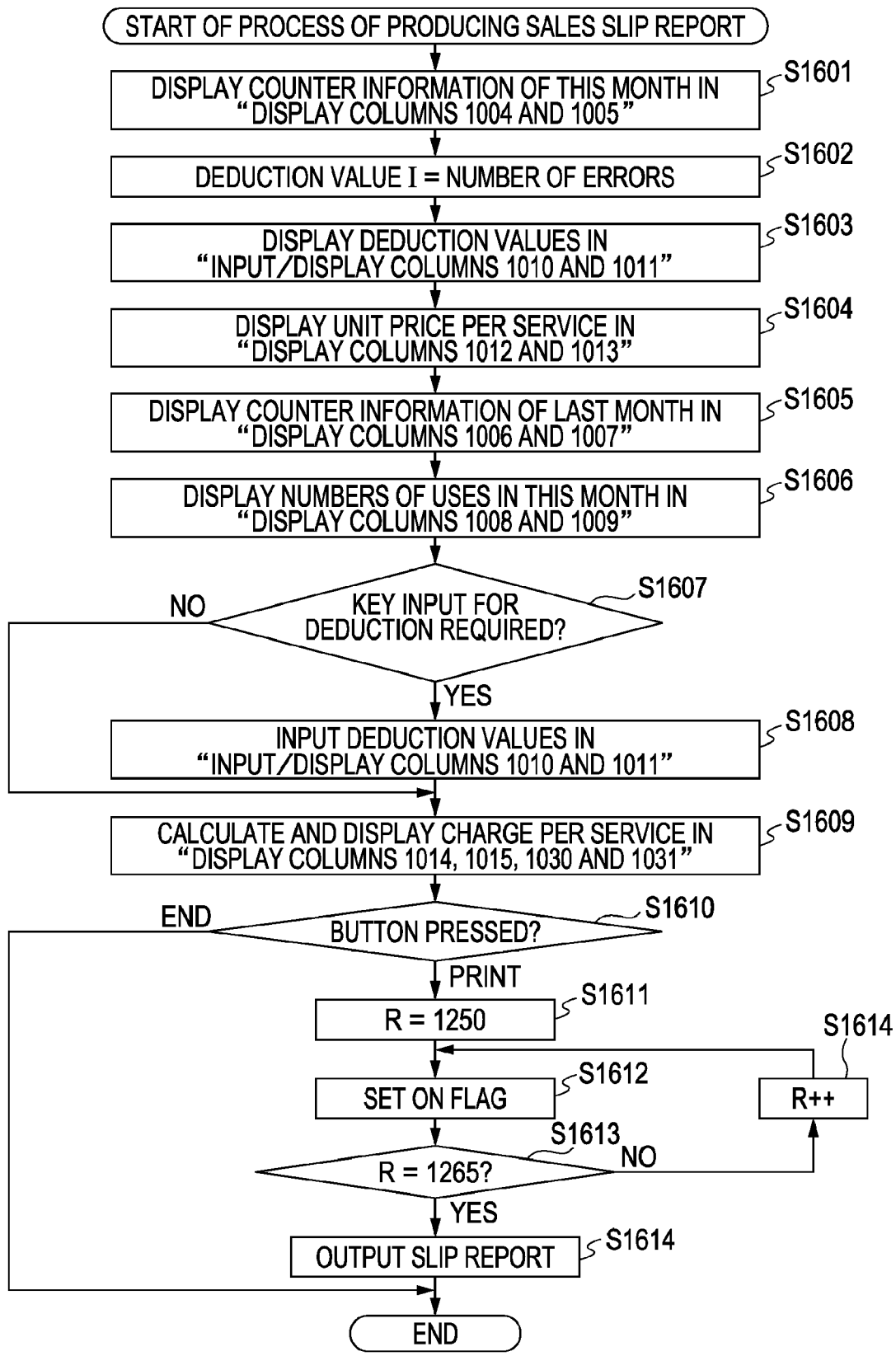
FIG. 21 is a flowchart of an embodiment of a process of producing a sales slip report on the sales slip producing screen in an image forming apparatus.

FIG. 21 is a flowchart according to one embodiment of a program for implementing a process of producing the sales slip report 1330 in the image forming apparatus 102. This process is executed by the CPU in accordance with the program stored in the ROM 131 while the RAM 132 is used as a work memory.

With respect to the "this time" column 1016, the acquired FAX counter information of June is displayed in the FAX counter information display column 1004 for June, and the acquired copy counter information of June is displayed in the copy counter information display column 1005 for June (S1601).

After the processing of S1601, the number of errors in the FAX job may be counted from the details of the FAX-job deduction target list file of June, which has been prepared in S908 of FIG. 12 (S1602).

Also, the number of errors in the copy job may be counted from the details of the copy-job deduction target list file of June, which has been prepared in S908 of FIG. 12 (S1602).

After the processing of S1602, with respect to the deduction column 1019, the number of errors in the FAX job, which has been obtained in S1602, may be displayed in the FAX-job deduction input/display column 1010 (S1603).

Also, the number of errors in the copy job, which has been obtained in S1602, may be displayed in the copy-job deduction input/display column 1011 (S1603). While the number of errors is displayed in the illustrated example, a predetermined proportion of the number of uses may be counted and displayed instead of the number of errors.

After the processing of S1603, with respect to the unit price column 1020, the unit price information of the FAX service is displayed in the FAX-job unit price display area 1012 and the unit price information of the copy service is displayed in the copy-job unit price display area 1013 (S1604).

After the processing of S1604, with respect to the "last time" column 1017, the acquired FAX counter information of May is displayed in the FAX counter information display column 1006 for May, and the acquired copy counter information of May is displayed in the copy counter information display column 1007 for May (S1605).

After the processing of S1605, with respect to the number-of-uses column 1018, the difference between numerical values in the FAX counter information display column 1004 for June and the FAX counter information display column 1006 for May is displayed in the FAX number-of-uses display column 1008 (S1606).

Also, the difference between numerical values in the copy counter information display column 1005 for June and the copy counter information display column 1007 for May is displayed in the copy number-of-uses display column 1009.

After the processing of S1606, it is determined whether a key input for deduction is appropriate (S1607). If the determination result indicates that the key input is appropriate (YES in S1607), respective deduction values are input in the FAX-job deduction input/display column 1010 and the copy-job deduction input/display column 1011 (S1608). On the other hand, the determination result in S1607 indicates that the key input is not appropriate (NO in S1607), the processing advances to S1609.

After the processing of S1609, the charges for the FAX services are displayed in the FAX detailed charge display column 1014 and the subtotal of the charges is displayed in the FAX subtotal display column 1029 (S1609). Also, the charges for the copy services are displayed in the copy detailed charge display column 1015 and the subtotal of the charges is displayed in the copy subtotal display column 1030 (S1609). Then, the total of numerical values in the FAX subtotal display column 1029 and the copy subtotal display column 1030 are displayed in the "TOTAL" display column 1031 (S1609).

After the display processing of S1609, which one of the button is pressed is determined (S1610). If the determination result indicates that the print button is pressed, the job log information corresponding to the pointer value at the head of the ring buffer, which is designated by 1250 in FIG. 16, is set to R that is a parameter set in the work memory (S1611). After the processing of S1611, the synchronization flag 108 is set on for the log designated by R (S1612).

After the processing of S1612, it is determined whether the log designated by R is information located at the tail end 1265 of the ring buffer in FIG. 16 (S1613). If the determination result indicates that the relevant log is information located at the tail end 1265 of the ring buffer (YES in S1613), the job log information is output as a slip report (S1614) and the processing is brought to an end. On the other hand, the determination result indicates that the relevant log is information not located at the tail end 1265 of the ring buffer (NO in S1613), the pointer value corresponding to the next log is set to R (S1614) and the processing is returned to S1612. If it is determined that the end button is pressed (S1610), the processing is brought to an end.

As described above, the exemplary embodiment of the present invention provides the scheme for, in management of sales for services offered by the image forming apparatus, ensuring matching of information when the counter information and the job log information are acquired from the image forming apparatus and totalized. In other words, for example, a deduction corresponding to error(s) occurred in the execution of services can be accurately performed by employing the job log information in addition to the counter information. Also, when services are offered by a plurality of companies, the sales can be flexibly distributed to the companies per service.

The system configuration is not limited to that described above in the exemplary embodiment so long as a management system is able to perform log management regarding the job log information and counter management regarding the counter information, and to produce a slip on the basis of the managed information. For example, the functions of the counter collection server, the job log collection server, and the slip producing server may be implemented by one management server (i.e., an external server for a plurality of image forming apparatuses). As a matter of course, the counter collection server and the job log collection server may be implemented by one management server.

While several exemplary embodiments have been described above, the present invention can also be applied to a system constituted by a plurality of units or to an apparatus constituted by a single unit. Such a system may be, e.g., a computer system including a printer, a facsimile, a PC, a server, and a client.

The present invention can also be practiced by supplying a software program, which implements the functions of the above-described exemplary embodiment, to a system or an apparatus directly or from a remote place, and causing a computer included in the system, etc. to read and execute code of the supply program.

Accordingly, the program code installed in an information processing apparatus to realize the functions and the processing in the exemplary embodiment of the present invention may also serve itself to implement the present invention. In other words, the computer program to realize the functions and the processing in the exemplary embodiment may also constitute one form for implementing the present invention.

In such a case, the program may have a suitable form including, e.g., object code, a program executed by an interpreter, and script data supplied to OS, so long as it has the function of a program.

A recording medium usable to provide the program can be, e.g., a flexible disk, a hard disk, an optical disk, a magneto-optical (MO) disk, CD-ROM, CD-R, and CD-RW. Other examples of the recording medium include a magnetic tape, a nonvolatile memory card, ROM, and DVD (DVD-ROM and DVD-R).

In one version, the program may be downloaded from a homepage through the Internet by using a browser in an information processing apparatus at a client. In other words, the computer program itself according to the exemplary embodiment of the present invention or a compressed program file having an automatic installing function may be downloaded to a recording medium, such as a hard disk. Also, the program code constituting the program to implement exemplary embodiment of the present invention may be divided into a plurality of files, which may be downloaded from different home pages. Thus, a WWW server allowing downloading, to users, one or more program files for implementing the functions and the processing in the exemplary embodiment of the present invention by a computer serves also as a constituent element of the exemplary embodiment of the present invention.

In a further embodiment, the program according to the exemplary embodiment of the present invention may be encrypted and stored in a storage medium, e.g., CD-ROM, and distributed to users. In this case, key information for decrypting the encrypted program may be downloaded from a homepage through the Internet only to qualified users who have cleared predetermined conditions, and the encrypted program may be decrypted with the key information to be installed in an information processing apparatus.

The functions of the above-described exemplary embodiments may be implemented by a computer reading and executing the program. An OS operating on the computer may execute a part or the whole of actual processing in accordance with instructions from the program. The functions of the above-described exemplary embodiment can also be implemented in that case.

Additionally, the program read from the recording medium may be written into a memory which is arranged in a function expansion board inserted in an information processing apparatus or a function expansion unit connected to the information processing apparatus. A CPU or the like installed in the function expansion board or the function expansion unit may execute a part or the whole of actual processing in accordance with instructions from the program. The functions of the above-described exemplary embodiment can also be implemented in such a manner.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-283545 filed Oct. 31, 2007, which is hereby incorporated by reference herein in its entirety.

What is claimed is:

1. An image forming apparatus connected to a management server that manages plural image forming apparatuses, the image forming apparatus holding counter information obtained by integrating a consumption of a consumable that depends on usage of service provided by the image forming apparatus, the image forming apparatus comprising:
   a registration unit configured to register a log, including information regarding a history of usage of the service, in job log information with a synchronization flag set off, the synchronization flag being used for synchronization with outputting of the counter information;
   a flag setting unit configured to set on the synchronization flag for the log in the job log information, for which the synchronization flag is set off, when the counter information is output;
   a reception unit configured to receive, from the management server, an acquisition request for acquiring the counter information or the job log information;
   a counter outputting unit configured to output, in response to the acquisition request received, the counter information to the management server after the synchronization flag for the log having the synchronization flag set off has been set on by the flag setting unit; and
   a log outputting unit configured to output, in response to the acquisition request received, the job log information to the management server after the counter information has been output by the counter outputting unit,
   wherein the job log information is managed by using a ring buffer, and
   wherein the synchronization flag for the log in the job log information is set on by the flag setting unit without receiving the externally-sent acquisition request by the image forming apparatus such that the log, which is already registered and has the synchronization flag set off, is not overwritten with a log newly registered by the registration unit, and the counter information and the job log information are output to the management server by the counter outputting unit and the log outputting unit.

2. The image forming apparatus according to claim 1, further comprising a determination unit configured to determine whether the outputting of the counter information by the counter outputting unit has succeeded,
   wherein when the determination unit determines that the outputting of the counter information has succeeded, the job log information is output by the log outputting unit, and
   wherein when the determination unit determines that the outputting of the counter information has failed, the synchronization flag for the log in the job log information, for which the synchronization flag has been set on by the flag setting unit, is set off without outputting the job log information by the log outputting unit.

3. A method executed in an image forming apparatus connected to a management server that manages plural image forming apparatuses, the image forming apparatus holding counter information obtained by integrating a consumption of a consumable that depends on usage of service provided by the image forming apparatus, the method comprising:
   registering a log, including information regarding a history of usage of the service, in job log information with a synchronization flag set off, the synchronization flag being used for synchronization with outputting of the counter information;
   setting on the synchronization flag for the log in the job log information, for which the synchronization flag is set off, when the counter information is output;
   receiving, from the management server, an acquisition request for acquiring the counter information or the job log information;
   outputting, in response to the acquisition request, the counter information to the management server after the synchronization flag for the log having the synchronization flag set off has been set on; and outputting, in response to the acquisition request received, the job log information to the management server after the counter information has been output, wherein the job log information is managed by using a ring buffer, and wherein the synchronization flag for the log in the job log information is set without receiving the externally-sent acquisition request by the image forming apparatus such that the log, which is already registered and has the synchronization flag set off, is not overwritten with a log newly registered, and the counter information and the job log information are output to the management server.

4. The information processing method according to claim 3, further comprising determining whether the outputting of the counter information has succeeded, wherein when a determination result indicates that the outputting of the counter information has succeeded, the job log information is output, and wherein when the determination result indicates that the outputting of the counter information has failed, the synchronization flag for the log in the job log information, for which the synchronization flag has been set on, is set off without outputting the job log information.

5. A non-transitory computer-readable storage medium comprising computer-executable instructions for controlling an image forming apparatus connected to a management server that manages plural image forming apparatuses, the image forming apparatus holding counter information obtained by totaling a consumption of a consumable that depends on usage of a service provided by the image forming apparatus, the computer-readable storage medium comprising:

computer-executable instructions for registering a log, including information regarding a history of usage of the service, in job log information with a synchronization flag set off, the synchronization flag being used for synchronization with outputting of the counter information;

computer-executable instructions for setting on the synchronization flag for the log in the job log information, for which the synchronization flag is set off, when the counter information is output;

computer-executable instructions for receiving, from the management server, an acquisition request for acquiring the counter information or the job log information;

computer-executable instructions for outputting, in response to the acquisition request received, the counter information to the management server after the synchronization flag for the log having the synchronization flag set off has been set on; and computer-executable instructions for outputting, in response to the acquisition request received, the job log information to the management server after the counter information has been output, wherein the job log information is managed by using a ring buffer, and wherein the synchronization flag for the log in the job log information is set without receiving the externally-sent acquisition request by the image forming apparatus such that the log, which is already registered and has the synchronization flag set off, is not overwritten with a log newly registered, and the counter information and the job log information are output to the management server.

6. A management system comprising: an image forming apparatus holding counter information obtained by integrating a consumption of a consumable that depends on usage of service provided by the image forming apparatus; a job log collection server collecting job log information from the image forming apparatus; a counter collection server collecting the counter information from the image forming apparatus; and a slip producing server producing a slip on the basis of the job log information and the counter information, wherein the image forming apparatus comprises:

a registration unit configured to register a log, including information regarding a history of usage of the service, in the job log information with a synchronization flag set off, the synchronization flag being used for synchronization with outputting of the counter information;

a flag setting unit configured to set on the synchronization flag for the log in the job log information, for which the synchronization flag is set off, when the counter information is output;

a counter outputting unit configured to output the counter information to the counter collection server after the synchronization flag for the log having the synchronization flag set off has been set on by the flag setting unit; and a log outputting unit configured to output the job log information to the job log collection server after the counter information has been output by the counter outputting unit, the job log collection server comprises a producing unit configured to, when the job log information is received from the image forming apparatus, produce a job log real file by comparing logs in the job log information received this time with logs in the job log information received last time, and by extracting logs which correspond to the received job log information and to the counter information output to the counter collection server from the image forming apparatus, and the slip producing server comprises a producing unit configured to acquire the counter information and the job log real file from the counter collection server and the job log collection server, and to produce a slip representing the usage of the service provided by the image forming apparatus.

7. A method executed in a management system comprising an image forming apparatus holding counter information obtained by integrating a consumption of a consumable that depends on usage of service provided by the image forming apparatus, a job log collection server collecting job log information from the image forming apparatus, a counter collection server collecting the counter information from the image forming apparatus, and a slip producing server producing a slip based on the job log information and the counter information, wherein the image forming apparatus executes:

registering a log, including information regarding a service execution result corresponding to the usage of the service, in job log information with a synchronization flag set off, the synchronization flag being used for synchronization with outputting of the counter information;

setting on the synchronization flag for the log in the job log information, for which the synchronization flag is set off, when the counter information is output;

outputting the counter information to the counter collection server after the synchronization flag for the log having the synchronization flag set off has been set on; and outputting the job log information to the job log collection server after the counter information has been output, the job log collection server executes, when the job log information is received from the image forming apparatus, the production of a job log real file by comparing logs in the job log information received this time with logs in the job log information received last time, and by extracting logs which correspond to the received job log information and to the counter information output to the counter collection server from the image forming apparatus, and the slip producing server executes the acquisition of the counter information and the job log real file from the counter collection server and the job log collection server, and produces a slip representing the usage of the service provided by the image forming apparatus.

* * * * *